US006440509B1

United States Patent
Littlejohn et al.

(10) Patent No.: US 6,440,509 B1
(45) Date of Patent: Aug. 27, 2002

(54) COMPARTMENTED DISPOSABLE PLATE WITH ASYMMETRIC RIB GEOMETRY

(75) Inventors: Mark B. Littlejohn, Appleton; Anthony J. Swiontek, Neenah; Margaret P. Neer, Neenah; Cristian M. Neculescu, Neenah; Brigitte K. Weigert, Appleton, all of WI (US)

(73) Assignee: Fort James Corporation, Deerfield, IL (US)

( * ) Notice: Subject to any disclaimer, the term of this patent is extended or adjusted under 35 U.S.C. 154(b) by 0 days.

(21) Appl. No.: 09/354,706

(22) Filed: Jul. 16, 1999

(51) Int. Cl.$^7$ .................................................. B29D 7/01
(52) U.S. Cl. ...................... 428/35.7; 220/556; 220/575; 229/406; 229/407
(58) Field of Search ................................ 220/575, 556; 229/406, 407; 428/35.7

(56) References Cited

U.S. PATENT DOCUMENTS

| | | |
|---|---|---|
| D41,986 S | 12/1911 | Smith |
| D51,874 S | 3/1918 | Beyrand |
| D61,248 S | 7/1922 | Reizenstein |
| 1,440,070 A | 12/1922 | Fry |
| D66,556 S | 2/1925 | Cunningham |
| D76,433 S | 9/1928 | Tams |
| D86,627 S | 3/1932 | Newton |
| 1,848,066 A | 3/1932 | Shepard et al. |
| D88,688 S | 12/1932 | Thompson |
| D103,599 S | 3/1937 | Ruck |
| D106,554 S | 10/1937 | Wilson |
| D109,494 S | 5/1938 | Leigh |
| D116,789 S | 9/1939 | Barbiers |
| D116,790 S | 9/1939 | Barbiers |
| D135,030 S | 2/1943 | Harshman |
| D140,345 S | 2/1945 | Fordyce |
| D164,669 S | 10/1951 | Chaplin ...................... D44/15 |
| D169,133 S | 3/1953 | Foster ......................... D44/10 |
| D179,011 S | 10/1956 | Kimble ........................ D36/2 |
| 2,928,567 A | 3/1960 | Davis ........................... 220/13 |
| D188,502 S | 8/1960 | Metzler et al. .............. D44/15 |
| D190,336 S | 5/1961 | Denni et al. ................. D44/15 |
| 3,001,665 A | 9/1961 | Tomarin ....................... 220/4 |
| D221,290 S | 7/1971 | Wiedemann ..................... D7/1 |
| 3,672,538 A | 6/1972 | Wiedemann et al. ...... 220/97 C |
| 3,675,811 A | 7/1972 | Artz ........................... 220/20 |
| D232,613 S | 9/1974 | Cheladze ....................... D7/1 |
| 3,931,890 A | 1/1976 | Davis .......................... 206/508 |
| D250,928 S | 1/1979 | Franklin ........................ D7/1 |
| D251,713 S | 5/1979 | Brody .......................... D7/28 |
| D275,255 S | 8/1984 | Durand ......................... D7/28 |
| D276,117 S | 10/1984 | Solt ............................. D7/36 |
| D279,345 S | 6/1985 | Durand ......................... D7/28 |
| 4,734,450 A | 3/1988 | Kawai et al. ................ 524/413 |
| 4,809,876 A | 3/1989 | Tomaswick et al. ........ 220/458 |
| 4,933,526 A | 6/1990 | Fisher et al. .......... 219/10.55 M |
| 4,981,631 A | 1/1991 | Cheung et al. ............... 264/50 |
| D316,800 S | 5/1991 | Wertheim .................... D7/547 |
| 5,023,286 A | 6/1991 | Abe et al. ................... 524/128 |
| 5,045,369 A | 9/1991 | Kobayashi et al. ......... 428/36.7 |
| 5,088,640 A | * 2/1992 | Littlejohn et al. ........ 229/2.5 R |
| 5,165,978 A | 11/1992 | Lecinski ....................... 428/66 |
| D342,186 S | 12/1993 | Frere ......................... D7/396.1 |

(List continued on next page.)

FOREIGN PATENT DOCUMENTS

EP 0841150 A2 * 5/1998 ............ B29D/7/01

Primary Examiner—C. Melissa Koslow
Assistant Examiner—Shalie Manlove
(74) Attorney, Agent, or Firm—Michael W. Ferrell

(57) ABSTRACT

A three-compartment, disposable food serving plate includes three ribs in an asymmetric array angularly joined to the bottom and sidewall of the plate. The plate preferably includes a four radius, smooth profile from the bottom to the outer rim and is formed from mineral-filled polyolefin sheet. Mica-filled polypropylene is particularly preferred.

42 Claims, 4 Drawing Sheets

U.S. PATENT DOCUMENTS

| | | |
|---|---|---|
| 5,300,747 A | 4/1994 | Simon .................. 219/729 |
| D348,804 S | 7/1994 | Feer ..................... D7/560 |
| D351,316 S | 10/1994 | Mann .................... D7/556 |
| D351,968 S | 11/1994 | Zivin .................... D7/564 |
| D354,884 S | 1/1995 | Carranza ............... D7/564 |
| 5,377,860 A | 1/1995 | Littlejohn et al. ...... 220/306 |
| 5,439,628 A | 8/1995 | Huang .................. 264/175 |
| D364,537 S | 11/1995 | Anderson .............. D7/553 |
| 5,622,780 A | 4/1997 | Paleari .................. 428/328 |
| 5,665,442 A | 9/1997 | Andersen et al. ...... 428/36.4 |
| D386,048 S | 11/1997 | Bebaway ............... D7/549 |
| 5,758,773 A | 6/1998 | Clements ............... 206/519 |
| 6,100,512 A * | 8/2000 | Neculescu et al. ...... 219/725 |
| 6,120,863 A * | 9/2000 | Neculescu et al. ...... 428/35.7 |
| D434,605 S * | 12/2000 | Littlejohn et al. ...... D7/546 |

* cited by examiner

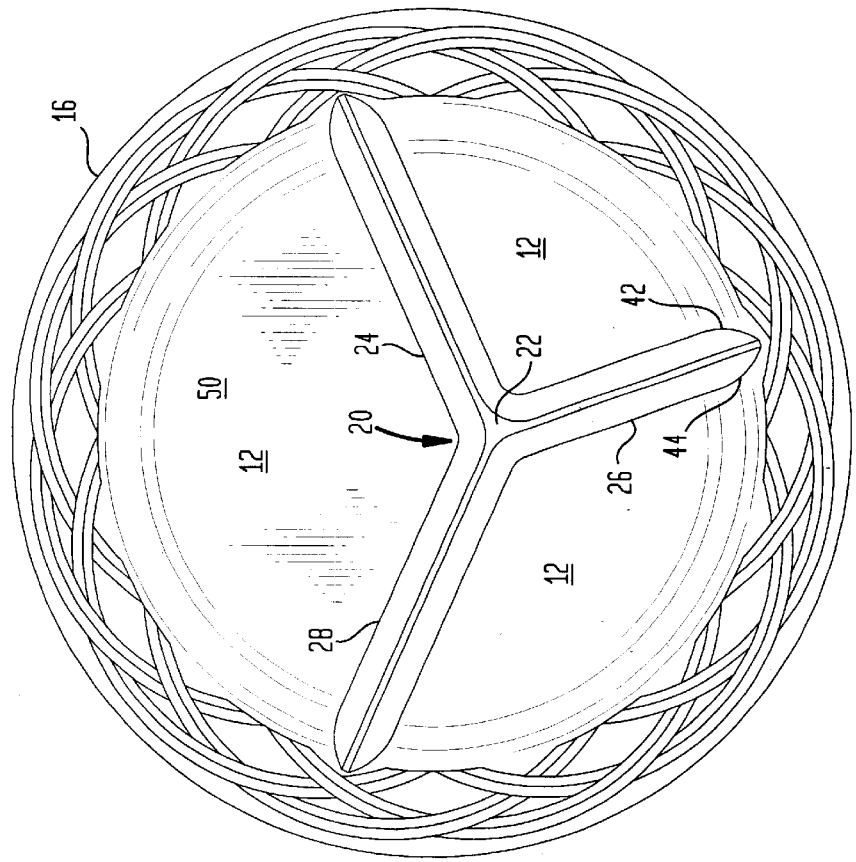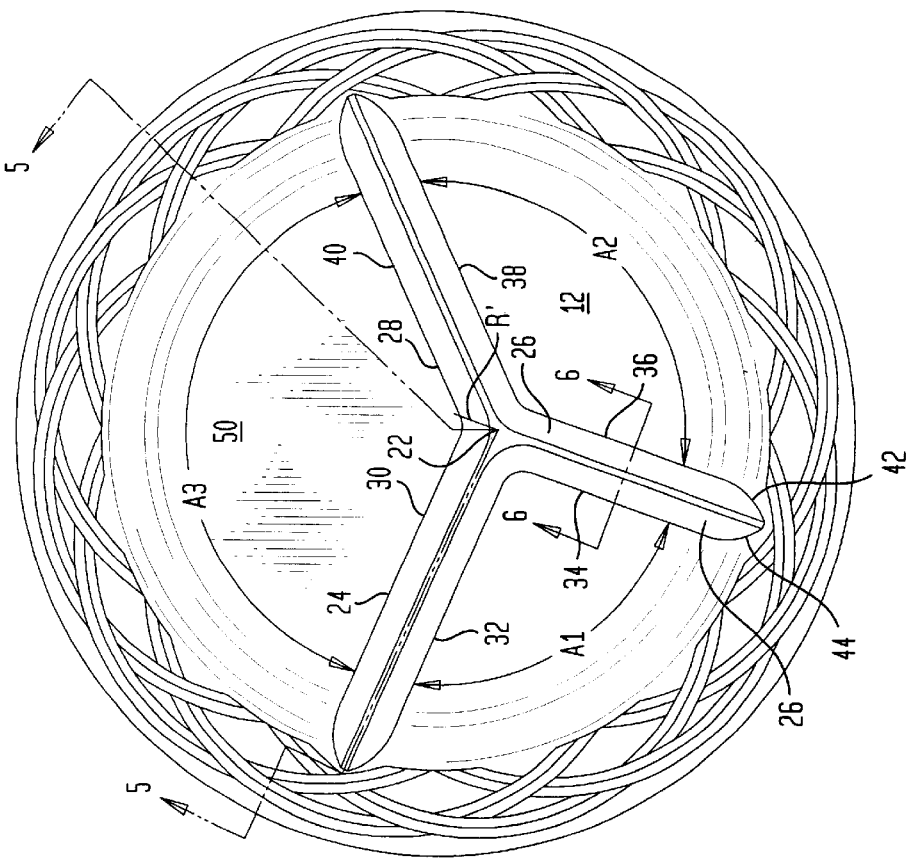

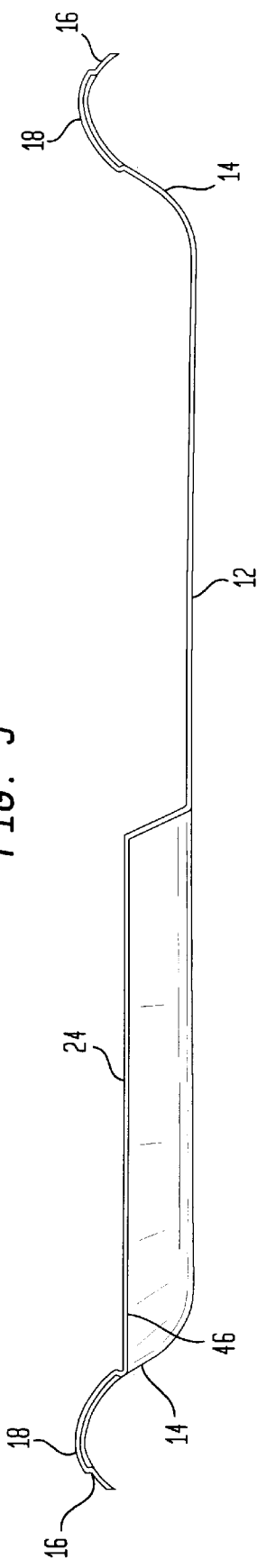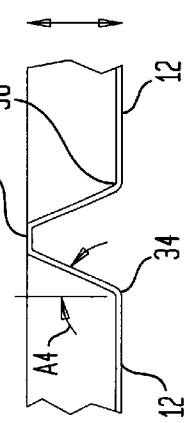

COMPARTMENTED DISPOSABLE PLATE WITH ASYMMETRIC RIB GEOMETRY

TECHNICAL FIELD

The present invention relates to disposable plates and particularly to compartmented disposable food serving plates.

BACKGROUND

Disposable compartmented plates are known. There is disclosed in U.S. Pat. No. 1,848,066 to Shephard et al. a disposable paper plate with three compartments. According to the description, the article may be square or rectangular, divided into two, four or more equal or unequal compartments by partitions. Page 2, col. 1, lines 18–21; page 2, col. 2, lines 72–74. The ribs are generally V-shaped. See, also, Des. 169,133 to Foster which discloses a tray having compartments of varying size. So also, the following U.S. Design patents disclose plates, food trays and the like with non-symmetrical partitions: U.S. Des. Pat. No. 386,048 to Bebaway; U.S. Des. Pat. No. 316,800 to Wertheim; while U.S. utility Pat. No. 3,675,811 to Artz discloses a container with different sized compartments. Of general interest with respect to basket-like designs which may be utilized in accordance with the present invention are U.S. Design Pat. Nos: Des. 279,345 to Durand; U.S. Des. Pat. No. 190,336 to Denni et al.; U.S. Des. Pat. No. 179,011 to Kimble; U.S. Des. Pat. No. 140,345 to Fordyce; U.S. Des. Pat. No. 135,030 to Harshman; U.S. Des. Pat. No. 116,789 to Barbiers; U.S. Des. Pat. No. 109,494 to Leigh; U.S. Des. Pat. No. 106,554 to Wilson and U.S. Des. Pat. No. 88,688 to Thompson.

Articles with symmetrical compartments as opposed to non-symmetrical compartments are perhaps more common in the art, as may be seen in U.S. Design Pat. No. Des. 250,928 to Franklin; U.S. Des. Pat. No. 232,613 to Cheladze; U.S. Des. Pat. No. 221,290 to Weideman; U.S. Des. Pat. No. 351,316 to Mann; U.S. Des. Pat. No. 364,537 to Anderson; U.S. Des. Pat. No. 188,502 to Metzler; U.S. Des. Pat. No. 164,669 to Chaplin; U.S. Des. Pat. No. 41,986 to Smith; as well as in U.S. utility Pat. Nos. 3,001,665 to Tomarin; 2,928,567 to Davis; and 1,440,070 to Fry.

The asymmetric articles in accordance with the present invention offer particular advantages, such as increased rigidity and toughness as will be better understood from the description which follows.

SUMMARY OF INVENTION

Disposable three compartmented food serving plates in accordance with the present invention provide convenience by having differing volumetric capacities for each compartment section, increased product strength per weight ratio, and an ergonomic rim profile for ease of holding and carrying. These advantages are provided by a plate profile comprised of four radii and a nonsymmetrical compartmented divider with the preferred dimensional characteristics. The plate profile also provides a curvilinear rim surface onto which patterning can be applied for visual and tactile purposes.

Typical three compartmented food serving plates have two smaller compartment sections that are equal in volumetric capacity and compartmented dividers that are symmetric when viewed from the top of the plate. This invention, having three compartments with differing volumetric capacities, provides more food placement options to the user. For example, the user may choose the largest food compartment for the main entree, the medium compartment for a larger side item portion and the smallest compartment for a smaller side item portion.

Compartmented plates are often improperly designed and lack the rigidity necessary when carrying the plates with a food load. The lower rigidity plates when loaded with food and carried with one hand can have excessive product distortion/deflection resulting in food spillage. Even worse, the plate can buckle by hinging along the compartmented rib divider resulting in more severe product distortion/deflection and food spillage.

The three compartmented plate described in this invention disclosure has a rib divider design which provides greater rigidity to minimize product distortion/deflection and reduce the chances for food spillage. The angles between the compartmented rib dividers were chosen to reduce plate buckling or hinging while maintaining adequate sized food containing sections with differing capacities.

The compartmented rib divider cross-sectional geometry and intersection to the plate four radii profile are also unique and believed to contribute to the greater product rigidity and reduction in plate buckling. The plate of this invention disclosure has a rib cross-section consisting of sharp junctions between the rib sidewall and plate bottom, and rib sidewall and flat rib top. Typical prior art compartmented plate designs have radius fillets between the rib sidewall and plate bottom and a radius for the rib top. The plate of this invention disclosure also has compartmented rib dividers which abruptly terminate at the plate rim profile. This is in contrast to typical prior art compartmented plates which have large blending radii between the dividers and plate rim profile when viewed from the top.

The outer plate curvilinear profile consists of four radii having the preferred dimensions. The four radii design provides an ergonomic rim profile for ease of holding and carrying as will be appreciated from the discussion which follows.

The four radii plate profile and nonsymmetrical compartmented rib divider, having the desired angles between the dividers, sharp cross-sectional junctions and abrupt terminations at the plate rim profile as described in this invention disclosure, cooperate to provide greater rigidity and reduced buckling tendency.

Flange patterning can also be added to the product for visual or tactile purposes as noted above; however, the flange patterning should be chosen in a manner such that it does not interfere with the preferred compartment divider design.

In particularly preferred aspects of the present invention there is provided a three compartment disposable plate comprising a substantially planar bottom portion, a sidewall portion extending about the periphery of said bottom portion and projecting upwardly therefrom, a flange portion extending outwardly from said sidewall portion and a divider portion configured so as to segment said plate into three compartments of differing volume. The divider portion has a central junction portion and three ribs extending outwardly therefrom, a first rib, a second rib and a third rib; each of the ribs projecting upwardly from said bottom portion and extending from said central junction portion to the sidewall portion. Each of the ribs is substantially angularly joined to the bottom portion and the sidewall portion. A first included angle between the first and second ribs differs from a second included angle between the second and third ribs. A third included angle between the first and third ribs differs from said first and second included angles. Preferably, the first and second included angles, in the aggregate, total more than about 200 degrees, while the first included angle is from about 90 to about 110 degrees and the second included angle is from about 115 to about 135 degrees. The third included angle is preferably from about 125 to about 145 degrees.

In preferred embodiments, the first, second and third ribs have a substantially flat top portion, wherein the substantially flat top portion of the ribs is substantially angularly joined to a pair of upwardly projecting rib walls. The ratio of the diameter of the plate to the widths of the substantially flat top portions of the ribs is generally from about 55 to about 110, and more preferably the ratio of the diameter of the plate to the widths of the substantially flat portions is from about 65 to about 90.

In another preferred embodiment there is provided a three compartment disposable plate comprising a substantially planar bottom portion, a sidewall portion extending about the periphery of the bottom portion and projecting upwardly therefrom, a flange portion extending outwardly from the sidewall portion and a divider portion configured so as to segment the plate into three compartments of differing volume. The divider has a central junction portion and three ribs extending outwardly therefrom, a first rib, a second rib and a third rib; each of the ribs projecting upwardly from the bottom portion and extending from the central junction portion to the sidewall portion. Each of the ribs is substantially angularly joined to the bottom portion and the sidewall portion. A first included angle between said first and second ribs differs from a second included angle between the second and third ribs and a third included angle between the first and third ribs differs from the first and second included angles. The plate is formed of a mineral-filled polyolefin sheet and is characterized by a profile extending from the bottom portion to the outer edge of the flange, wherein changes in direction of the profile are perpetrated by way of a plurality of arcuate portions, each of the arcuate portions having a radius of curvature and wherein further, the ratio of the length of each of the radii of curvature to the diameter of the plate is at least about 0.02. Generally, the ratio of each of the radii of curvature to the diameter of said plate is at least about 0.03, and preferably, at least about 0.035.

The plate generally has a wall thickness of from about 10 to about 80 mils, and more preferably a wall thickness of from about 15 to about 25 mils.

In still yet another particularly preferred embodiment, the disposable plate has a wall thickness from about 10 to about 80 mils and consists essentially of from about 40 to about 90 percent by weight of a polypropylene polymer, from about 10 to about 60 percent by weight of a mineral filler, from about 1 to about 15 percent by weight polyethylene, from about 0.1 to about 5 weight percent titanium dioxide and optionally includes a basic organic or inorganic compound comprising the reaction product of an alkali metal or alkaline earth element with carbonates, phosphates, carboxylic acids as well as alkali metal and alkaline earth element oxides, hydroxides, or silicates and basic metal oxides, including mixtures of silicon dioxide with one or more of the following oxides: magnesium oxide, calcium oxide, barium oxide, and mixtures thereof.

The basic organic or inorganic compound may comprise calcium carbonate present in an amount of from about 5 to about 20 weight percent; whereas, polyethylene may be present from about 2.5 to about 15 percent by weight or from about 4 to about 5 weight percent.

Titanium dioxide is present generally from about 0.1 to about 3 weight percent, preferably from about 0.25 to about 2 percent by weight and is present in an amount of at least about 0.5 percent by weight in most cases. Wall caliper of from about 10 to about 50 mils are typical, while a wall caliper of from about 15 to about 25 mils is preferred. Mica is a preferred filler while a particularly preferred polypropylene polymer is isotactic polypropylene with a melt index of from about 0.3 to about 4 and preferably a melt flow index of about 1.5 in many cases. The polyethylene may be HDPE or LLDPE.

In still further aspects of the invention there is provided a disposable plate formed from a mineral-filled polyolefin sheet comprising: a substantially planar bottom portion; a first rim portion extending outwardly therefrom, the first rim portion being upwardly convex and subtending a first arc with a first radius of curvature; a second rim portion joined to the first rim portion, and extending outwardly therefrom, the second rim portion being downwardly convex, subtending a second arc with a second radius of curvature; a third rim portion joined to the second rim portion and extending outwardly therefrom, the third rim portion being downwardly convex, subtending a third arc with a third radius of curvature. The second and third rim portions form a sidewall portion. A fourth rim portion is joined to the third rim portion and extends outwardly therefrom, the fourth rim portion being downwardly convex subtending a fourth arc having a fourth radius of curvature. The length of the second arc of the second rim portion is substantially less than the length of the fourth arc of the fourth rim portion which, in turn, is substantially less than the length of the first arc of the first rim portion. The fourth radius of curvature of the fourth rim portion is less than the third radius of curvature of the third rim portion which, in turn, is less than the second radius of curvature of said second rim portion. The angle of the first arc is greater that about 55 degrees and the angle of the third arc is greater than about 45 degrees. The plate further includes a divider portion configured so as to segment said plate into three compartments of differing volume, the divider portion having a central junction portion and three ribs extending outwardly therefrom, a first rib, a second rib and a third rib. Each of the ribs projects upwardly from the bottom portion and extends from the central junction portion to the sidewall portion. Each of the ribs is substantially angularly joined to the bottom portion and the sidewall portion. A first included angle between the first and second ribs differs from a second included angle between the second and third ribs and a third included angle between the first and third ribs differs from the first and second included angles.

In general, the angle of the fourth arc is less than about 75 degrees. Preferably, the length of the first arc is substantially equivalent to the length of the third arc and the first radius of curvature of the first arc is substantially equivalent to the third radius of curvature of the third arc. The height of the center of curvature of the first rim portion above the plane of the bottom portion is substantially less than the distance by which the center of curvature of the second rim portion is below the plane of the bottom portion, whereas the horizontal displacement of the center of curvature of the second rim portion from the center of curvature of the first rim portion is at least about twice the first radius of curvature of the first rim portion. The height of the center of curvature of the third rim portion above the plane of the bottom portion is typically less than the height of the center of curvature of the fourth rim portion above the plane of the bottom portion, whereas the horizontal displacement of the center of curvature of the second rim portion is located outwardly from the center of curvature of both the third and fourth rim portions.

Most preferably, the height of the center of curvature of the third rim portion above the plane of the bottom portion is less than about 0.3 times the radius of curvature of the fourth rim portion and the height of the center of curvature of the fourth rim portion above the plane of the bottom portion is at least about 0.4 times the first radius of curvature of the first rim portion. The ratio of the length of the fourth radius of curvature to the diameter of the plate is preferably at least about 0.03, while the ratio of the length of the third radius of curvature to the diameter of the plate is at least about 0.050. The ratio of the length of the second radius of curvature to the diameter of the plate is generally at least about 0.2, while the ratio of the length of the first radius of curvature to the diameter of the plate is at least about 0.045.

In particularly preferred embodiments the length of the first arc is substantially equivalent to the length of the third arc and the length of the radius of curvature of the first arc is substantially equivalent to the length of the radius of curvature of the third arc.

BRIEF DESCRIPTION OF DRAWINGS

The invention is described in detail below with reference to the various drawings. In the drawings:

FIG. 3 is a top plan view of the plate of FIG. 1;

FIG. 4 is a bottom plan view of the plate of FIG. 1;

FIG. 5 is a view in elevation and section along line 5—5 of FIG. 3;

FIG. 6 is a view in elevation and section along line 6—6 of FIG. 3; and

DETAILED DESCRIPTION

Figure 1:
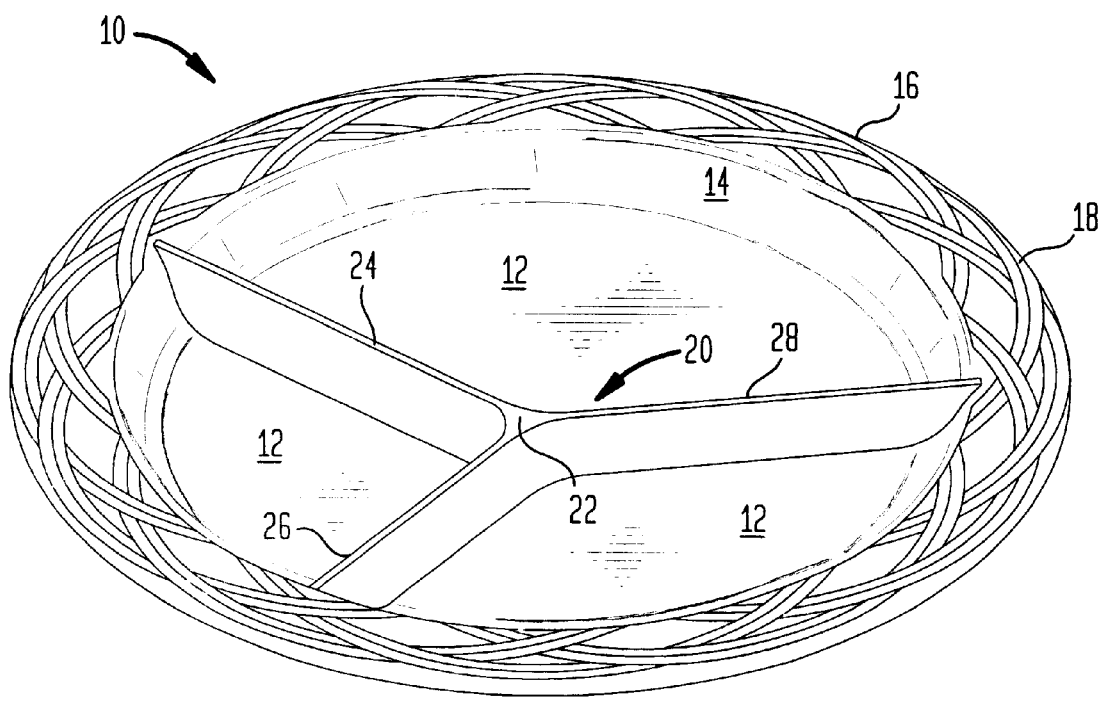
FIG. 1 is a view in perspective showing a disposable food serving plate having a design in accordance with the invention.
Figure 2:
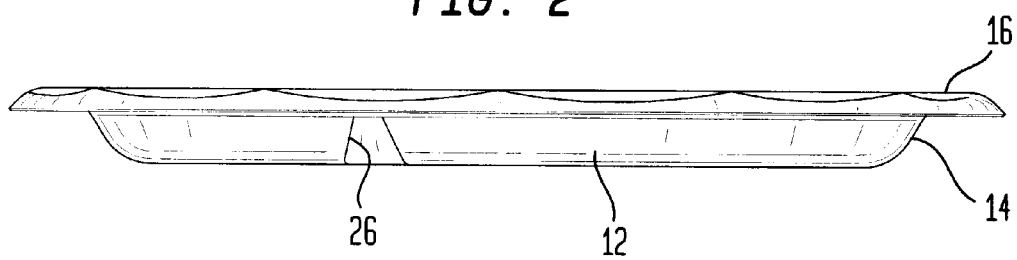
FIG. 2 is a view in elevation of the plate of FIG. 1.

The invention is described below in connection with the various drawings. Such illustration is for exemplification only and is not limitative of the invention. Thus, while the disposable plate in accordance with the invention is preferably formed of a low-odor, mineral-filled polypropylene sheet by way of thermoforming, other techniques are possible, as are alternate materials.

The forming process for making plates of the present invention may preferably include plug assist thermoforming as is known. See U.S. Pat. No. 5,641,524 to Rush et al., as well as the references referred to. So also, in order to make the sharp, angular junctions between the bottom of the inventive plate, for example, and the dividing ribs, it is preferable to fabricate a mold from multiple components so that the ribs are substantially angularly joined to the bottom and sidewall portions. Such aspects are beyond the scope of the present invention which is directed to the articles of manufacture set forth in the appended claims.

FIGS. 1–7 illustrate a disposable plate fabricated in accordance with the present invention. A plate 10 includes generally a substantially planar bottom portion 12 in three segments as well as a sidewall portion 14 and a flange portion 16 which may be provided with an embossed or a debossed pattern 18 as shown in FIGS. 1, 3, 4 and 5.

A divider portion 20 is integrally formed with the other portions 12, 14 and 16 of the plate as shown. Divider portion 20 has a central junction point 22 where a plurality of ribs 24, 26 and 28 converge. Ribs 24, 26 and 28 each define junctions with bottom portion 12 as shown in the drawings.

Thus rib 24 is joined to the bottom at 30 and 32 which are essentially straight lines while ribs 26 and 28 are joined to the bottom portion at lines 34 and 36 and lines 38 and 40, respectively.

Each of the junctions 30 through 40 are substantially angular, that is, have substantially no radius of curvature or a very small radius of curvature as is better appreciated from FIG. 6 which is a view along line 6—6 of FIG. 3. Although there is usually some finite radius of curvature between the ribs and the other portions of the plate, the ratio of the diameter of the plate to the radius of curvature of the junction regions, such as regions 34 and 36 should be at least about 200, preferably at least about 350. The same parameters also apply to the other junctions of the ribs to the sidewalls and preferably to the transition of the rib walls to the flat top portion of the ribs.

The ribs extend from junction point 22 to sidewall 14 where a plurality of substantially angular junctions such as junctions 42, 44 define the boundaries between the sidewall and rib. The height of the ribs may be configured to have a slight drop off at the sidewall in the region indicated at 46 on FIG. 6 if so desired in order to have a better fit with pattern 18. In the embodiment illustrated, which is an 11-inch diameter plate, the drop off is approximately 1/32 of an inch; while the ribs have an otherwise uniform height of approximately 0.6 inches.

There is further provided on each rib 24, 26, 28 a flat top, such as flat top 48 shown in FIG. 6. The flat top, which provides a truncated V-shape to the profile of the ribs, has a width of about 0.15 inches for the 11-inch diameter plate.

A salient feature of the inventive plate is the asymmetric arrangement of the ribs. In this regard, it should be noted that junction 20 is offset from the center of the plate at a distance (R') of about 0.70 inches for the 11-inch plate and the angles between the ribs are different. The center 22 of the rib junction is offset from the geometric center of the plate generally a distance R' along a radial line extending along the center axis of the rib 26. For the 11-inch plate illustrated, this distance is about 0.7 inches, as noted above, but may be from about 0.5 to about 0.9 inches for an 11-inch plate and may be scaled by way of the diameter of the plate for other sizes.

The angle between rib 24 and rib 26 is about 98 degrees as indicated by arc A1. Generally, this angle is between about 90 and 110 degrees while an angle A2 between rib 26 and 28 is about 127 degrees. Generally, angle A2 is from about 115 to about 135 degrees. Angle A1 and angle A2 total more than about 200 degrees in order to provide greater strength to the plate and reduced bucking tendency.

Still another angle A3 is defined between rib 28 and rib 24 to partition the largest compartment 50 of the plate.

The relatively severe, angular geometry of the rib portion is believed to contribute substantially to the rigidity of plate 10, much as a structural beam. In this connection it should be noted the ribs project upwardly at an angle A4 of about 30 degrees from a vertical line as can be seen in FIG. 6. Anywhere from about 20 to about 40 degrees form the vertical may be preferred in some embodiments.

The angular geometry of the rib portion is most preferably practiced with the relatively high modulus, mineral-filled polyolefin materials described hereinafter.

Figure 7:
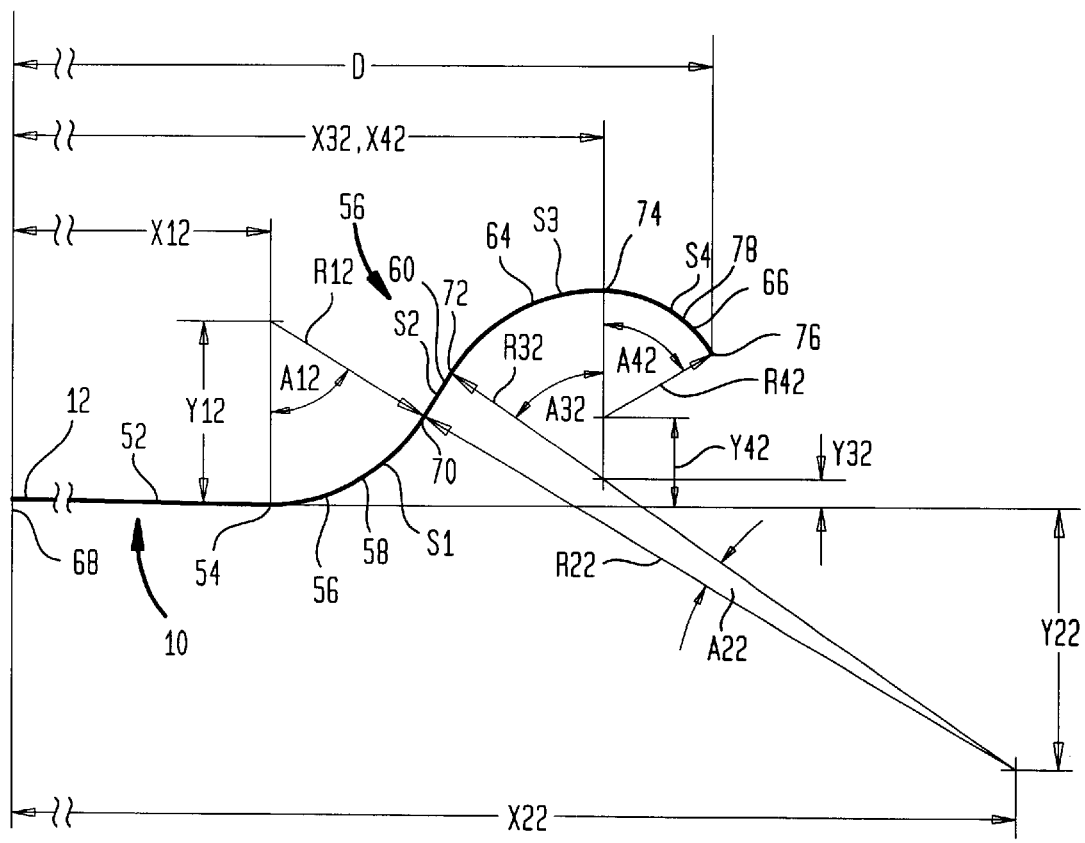
FIG. 7 is a schematic diagram illustrating the profile of the plate of FIG. 1 from the bottom to the outer flange.

In contrast to the rib profile, the profile of the other portions of the plate, in general, is best kept smooth and flowing, without sharp corners. There is shown in FIG. 7 a schematic diagram illustrating the profile of the plate from bottom 12 through the flange. For purposes of convenience, the profile of the plate is diagrammed in an area where there is no rib.

Illustrated schematically in FIG. 7, there is a plate 10 which includes a planar center 52 which, in turn, includes an outer peripheral surface 54. This center region 52 is generally planar, forming a bottom for plate 10. An outwardly projecting sidewall 56 includes a first rim portion 58 which is joined to the outer peripheral surface 54 of the planar center 52. A second rim portion 60 is joined to the first rim portion 58. The first rim portion 58 and the second rim portion 60 form, in part, the outwardly projecting sidewall 56 which forms the sidewall of the plate 10. Plate 10 includes a third rim portion 64 which is joined to the second rim portion 60 of the outwardly projecting sidewall 56. A fourth rim portion 66 is joined to the third rim portion 64. The fourth rim portion 66 forms the outer edge of the plate 10. The plate 10 defines a center line 68. The base or bottom-forming portion 12 extends from the center line 68 to outer peripheral surface 54.

From the center line 68 a predetermined distance X12 extends toward the outer peripheral surface forming portion 54. A distance Y12 extends a predetermined distance from the base or bottom-forming portion 12 upwardly therefrom. A radius R12 extends from the intersection point of the distance X12 and Y12 to form first rim ortion 58 of the outwardly projecting sidewall 56. The first rim portion 58 is defined by an arc A12 which extends from a substantially vertical line defined at the outer peripheral surface 54 to a fixed point 70. The arc A12 may be approximately 60°.

A distance X22 extends from the center line 68 to a predetermined point. A distance Y22 extends from the base or bottom-forming portion 12 of the plate 10 downwardly a predetermined distance. A radius R22 extends from the intersection of the lines X22 and Y22 to form a second rim portion 60 of the sidewall 56. The radius R22 extends from the first fixed point 70 to a second fixed point 72 through an arc A22. The arc A22 may be approximately 4°.

A distance X32 extends from the center line 68 to a predetermined distance. A distance Y32 extends from the base or bottom-forming section 12 of the plate 10 to project upwardly a predetermined distance. A radius R32 extends from the intersection of the lines X32 and Y32 to form the third rim portion 64. The radius R32 extends from the second fixed point 72 to a third fixed point 74. An arc A32 is formed between the second fixed point 72 and the third fixed point 74 to extend a predetermined distance. The arc A32 may be approximately 55°.

A distance X42 extends a predetermined distance from the center line 68. Similarly, a distance Y42 extends from the base or bottom-forming section 12 of the plate 10 to project upwardly. A radius R42 extends from the intersection of the lines X42 and Y42 to form a fourth rim portion 66 of the plate 10. An arc A42 is formed between the third fixed point 74 and a fourth fixed point 76 at diameter D from the center line. The arc A42 may be approximately 60°. A section 78 forms the outer edge of the plate.

In various embodiments of the present invention the container may be a 9-inch or 11-inch plate with profile coordinates as illustrated in FIG. 7 having the dimensions, angles, or relative dimensions enumerated in Tables 1 through 3.

TABLE 1

Dimensions and Angles For 9" Plate

| DIMENSION and ANGLES | VALUE (inches or degrees) |
|---|---|
| R12 | 0.537 |
| X12 | 3.156 |
| Y12 | 0.537 |
| R22 | 2.057 |
| X22 | 5.402 |
| Y22 | 0.760 |
| R32 | 0.564 |
| X32 | 4.167 |
| Y32 | 0.079 |
| R42 | 0.385 |
| X42 | 4.167 |
| Y42 | 0.258 |
| A12 | 60.00° |
| A22 | 4.19° |
| A32 | 55.81° |
| A42 | 60.00° |
| D | 9.00 |

TABLE 2

Dimensions and Angles For 11' PLATE

| DIMENSION/ANGLES | VALUE (inches or degrees) |
|---|---|
| R12 | 0.656 |
| X12 | 3.857 |
| Y12 | 0.656 |
| R22 | 2.514 |
| X22 | 6.602 |
| Y22 | 0.929 |
| R32 | 0.689 |
| X32 | 5.093 |
| Y32 | 0.097 |
| R42 | 0.470 |
| X42 | 5.093 |
| Y42 | 0.315 |
| A12 | 60.00° |
| A22 | 4.19° |
| A32 | 55.81° |
| A42 | 60.00° |
| D | 11.00 |

TABLE 3

Dimensions For 9 and 11 INCH PLATE

| DIMENSION RATIO OR ANGLE | VALUES (Dimensionless or degrees) | | |
|---|---|---|---|
| | PREFERRED | MINIMUM | MAXIMUM |
| R12/D | 0.060 | 0.045 | 0.075 |
| X12/D | 0.351 | 0.280 | 0.420 |
| Y12/D | 0.060 | 0.045 | 0.075 |
| R22/D | 0.228 | 0.180 | 0.275 |
| X22/D | 0.600 | 0.480 | 0.720 |
| Y22/D | 0.084 | 0.065 | 0.100 |
| R32/D | 0.063 | 0.050 | 0.075 |
| X32/D | 0.463 | 0.370 | 0.555 |
| Y32/D | 0.009 | 0.007 | 0.011 |
| R42/D | 0.043 | 0.034 | 0.052 |
| X42/D | 0.463 | 0.370 | 0.555 |
| Y42/D | 0.029 | 0.023 | 0.035 |
| A12 | 60.00° | 55.00° | 75.00° |
| A22 | 4.19° | 1.00° | 10.00° |
| A32 | 55.81° | 45.00° | 75.00° |

Salient features of the plate illustrated in FIGS. 1 through 7 generally include a substantially planar center portion with four adjacent rim portions extending outwardly therefrom, each rim portion defining a radius of curvature as set forth above and further noted below. The first rim portion extends outwardly from the planar center portion and is convex upwardly as shown. There is defined by the plate a first arc A12 with a first radius of curvature R12 wherein the arc has a length S1. A second rim portion is joined to the first rim portion and is downwardly convex, subtending a second arc A22, with a radius of curvature R22 and a length S2. A third, downwardly convex, rim portion is joined to the second rim portion and subtends an arc A32. There is defined a third radius of curvature R32 and a third arc length S3. A tangent to the third arc at the upper portion thereof is substantially parallel to the planer center portion as shown in FIG. 20. A fourth rim portion is joined to the third rim portion, which is also downwardly convex. The fourth rim portion subtends a fourth arc A42 with a length S4, with a radius of curvature R42.

The length of the second arc, S2 is generally less the length of the fourth arc S4, which, in turn, is less than the length S1 of the first arc A12. The radius of curvature R42 of the fourth arc is less than the radius of curvature R32 of the third rim portion, which in turn, is less than radius of curvature R22 of the second rim portion. The angle of the first arc, A12 is generally greater that about 55 degrees, while, the angle of the third arc, A32 is generally greater than about 45 degrees as is set forth in the foregoing tables. The angle of the fourth arc A42 is generally less than about 75 degrees and more preferably is about 60 degrees.

Typically, the length S1 of arc A12 is equivalent to the length S3 of arc A32 and R12 of the first rim portion is equivalent in length to the radius of curvature R32 of the third rim portion.

Generally speaking, the height of the center of curvature of the first arc (that is the origin of ray R12) above the central planar portion is substantially less than, perhaps twenty five percent or so less than, the distance that the center of curvature of the second rim portion (the origin of ray R22) is below the central planar portion. In other words, the length Y12 is about 0.75 times or less the length Y22.

So also, the horizontal displacement of the center of curvature of the second rim portion from the center of curvature of the first rim portion is at least about twice the length of the first radius of curvature R12. The height of the center of curvature of the third rim portion above the central planar portion is generally less than the height of the center of curvature of the fourth rim portion above the plane of the central planar portion. The horizontal displacement of the center of curvature of the second rim portion is generally outwardly disposed from the center of curvature of the third and fourth rim portions.

A further noteworthy feature of the plate of FIGS. 1 through 7 is that the height of the center of curvature of the third rim portion above the planar central portion is less than about 0.3 times the radius of curvature R42 of the fourth rim portion; while the height of the center of curvature of the fourth rim portion above the plane of the central portion is at least about 0.4 times the first radius of curvature R12. The plates are preferably made from mineral-filled polyolefin sheet such as polyethylene or polypropylene mineral-filled sheet as described in the appendix attached hereto.

As will be appreciated from the foregoing data tables as well as from the drawings and discussion above, the ratio of the fourth radius of curvature to the diameter of the plate is preferably at least about 0.03, while the ratio of the third radius of curvature to the diameter of the plate is preferably at least about 0.050. The ratio of the second radius of curvature to the diameter of the plate is preferably at least about 0.2 and the ratio of the length of the first radius of curvature to the diameter of the plate is preferably at least about 0.045.

PREFERRED MATERIALS

As noted above, plates constructed in accordance with the present invention are most preferably thermoformed from a plastic material, especially a mineral-filled plastic-polyolefin such as polyethylene and polypropylene are perhaps most suitable. Preferred materials are plastics or filled plastics. Typically, in filled plastics the primary mineral filler is mica, talc, kaolin, bentonite, wollastonite, milled glass fiber, glass beads (solid or hollow), silica, or silicon carbide whiskers or mixtures thereof. We have discovered that when polypropylene is melt-compounded with acidic-type minerals the resulting mixture has a higher odor index (offensive odors) that would disqualify them from use in food service products.

Acidic type fillers such as mica; natural clay minerals such as kaolinite, bentonite, attapulgite, montmorillonite, clarite, or fuller's earth; and silica are particularly detrimental in generating odor compounds when processed under high shear and high temperature conditions experienced during twin screw compounding. We have found that changing the compounding process and adding a basic or other odor supressing compound or component to the primary acidic filler allows the production of low odor index compounds. The reason for this effect is unknown since the fundamental cause of the degradation in polypropylene may be due, in part, to catalysis effects caused by impurities in the mineral as well as its acidic or basic nature. In this regard, the addition of $CaCO_3$ to talc is beneficial whereas, it may be unnecessary when wollastonite is used as the primary filler.

The preferred primary fillers are mica, talc, kaolin, bentonite, milled glass fibers, and wollastonite or mixtures thereof Of these, milled glass fibers and wollastonite are basic in nature and may not necessarily require the addition of a secondary basic component. An odor suppressing compound is also preferably included. As noted above, suitable mineral fillers include mica, talc, kaolin, bentonite, wollastonite, milled glass fiber, glass beads (hollow or solid), silica whiskers, silicon carbide whiskers and mixtures thereof as well as the mineral fillers recited herein, whereas the basic organic or inorganic compound is generally the reaction product of an alkali metal or alkaline earth element with carbonates, phosphates, carboxylic acids as well as alkali metal and alkaline earth element oxides, hydroxides, or silicates and basic metal oxides including mixtures of silicon dioxide with one or more of the following oxides: magnesium oxide, calcium oxide, barium oxide, and mixtures of the foregoing. More specifically, the basic organic or inorganic compound may be selected from the group consisting of: calcium carbonate, sodium carbonate, potassium carbonate, barium carbonate, aluminum oxide, sodium silicate, sodium borosilicate, magnesium oxide, strontium oxide, barium oxide, zeolites, sodium citrate, potassium citrate, calcium stearate, potassium stearate, sodium phosphate, potassium phosphate, magnesium phosphate, mixtures of silicon dioxide with one or more of the following oxides: magnesium oxide, calcium oxide, barium oxide, and mixtures of one or more of the above. Furthermore, hydroxides of the metals and alkaline earth elements recited above may be utilized.

Where a basic inorganic odor suppressing compound is chosen, generally such compound is selected from the group consisting of calcium carbonate, sodium carbonate, potassium carbonate, barium carbonate, aluminum oxide, sodium silicate, sodium borosilicate, magnesium oxide, strontium oxide, barium oxide, zeolites, sodium phosphate, potassium phosphate, magnesium phosphate, mixtures of silicon dioxide with one or more of the following oxides: magnesium oxide, calcium oxide, barium oxide, and mixtures of one or more of the basic inorganic compounds set forth above. The amount of a basic inorganic compound is generally from about 2 to 20 weight percent, but is usually from about 5 to about 15 weight percent of the article. Most preferably the basic inorganic compound selected is calcium carbonate; typically present from about 5 to about 20 weight percent.

Where an organic compound is chosen, it is typically selected from the group consisting of sodium stearate, calcium stearate, potassium stearate, sodium citrate, potassium citrate, and mixtures of these where the amount of such compound is from about 0.5 to about 2.5 weight percent of the article. Typically, microwaveable articles produced in accordance with the present invention exhibit an odor index of less than about 0.75; preferably less than about 0.6; with a practical lower limit being 0.1 or so.

As shown below in connection with microwaveability testing, and summarized in Table 11, competing commercial polystyrene type plates cannot withstand the high temperatures generated in the microwave oven during food contact and either significantly warp or deform when the aforementioned food products were heated on them. Under the usual microwaving conditions with high grease content foods, the prior art plates tend to deform and flow to the point where parts of the plate become adhered to the inside of the microwave oven. For disposable plates and containers, having suitable food contact olfactory properties, appearance and feel are important attributes. Another significant property of mica-filled polypropylene is its cut resistance.

Preferred articles are thermoformed and include a micronodular food contact surface. Micronodular food contact surfaces are produced by thermoforming a sheet into the article which has been extruded optionally with at least one matte roll and by vacuum thermoforming the sheet by applying vacuum opposite to the surface where the micronodular surface is desired. Most typically the micronodular surface will have a surface gloss of less than about 35 at 75° as measured by TAPPI method T-480-OM 92. Articles also will typically have a Parker Roughness Value of at least about 12 microns.

While any suitable polypropylene polymer may be used, the polypropylene polymers are preferably selected from the group consisting of isotactic polypropylene, and copolymers of propylene and ethylene wherein the ethylene moiety is less than about 10% of the units making up the polymer, and mixtures thereof. Generally, such polymers have a melt flow index from about 0.3 to about 4, but most preferably the polymer is isotactic polypropylene with a melt-flow index of about 1.5. In particularly preferred embodiments, the melt-compounded composition from which the resultant extruded sheet is formed into articles further includes a polyethylene component and titanium dioxide. The polyethylene component may be any suitable polyethylene such as HDPE, LDPE, MDPE, LLDPE or mixtures thereof.

The various polyethylene polymers referred to herein are described at length in the *Encyclopedia of Polymer Science & Engineering* (2d Ed.), Vol. 6; pp: 383–522, Wiley 1986; the disclosure of which is incorporated herein by reference. HDPE refers to high density polyethylene which is substantially linear and has a density of generally greater that 0.94 up to about 0.97 g/cc. LDPE refers to low density polyethylene which is characterized by relatively long chain branching and a density of about 0.912 to about 0.925 g/cc. LLDPE or linear low density polyethylene is characterized by short chain branching and a density of from about 0.92 to about 0.94 g/cc. Finally, intermediate density polyethylene (MDPE) is characterized by relatively low branching and a density of from about 0.925 to about 0.94 g/cc. Unless otherwise indicated these terms have the above meaning throughout the description which follows.

The microwaveable articles according to the invention typically exhibit melting points from about 250 to about 330° F. and include mica or other primary fillers in amounts from about 20 to about 35 weight percent. Most preferably mica is present at about 30 weight percent, and calcium carbonate is present from about 8 to about 12 weight percent.

It has been found that C8 and C9 organic ketones correlate well with or are associated with undesirable odors in polypropylene/mica compositions. Accordingly, it is preferred that articles in accordance with the invention are substantially free from volatile C8 and C9 organic ketones. In order to avoid undesirable odors, articles in accordance with the invention are preferably prepared from a melt-compounded polyolefin mica composition which is prepared at a process melt temperature of less than about 425° F.; with below about 400° F. being even more preferred. Optionally, the melt processed polyolefin/mineral composition is melt-compounded in a nitrogen atmosphere.

Thermoformed, mineral-filled polypropylene food contact articles may be formed from a melt-compounded composition comprising from about 40 to about 90 percent by weight of a polypropylene polymer, from about 10 to about 50 percent by weight of a primary mineral filler and an effective odor-reducing amount of a basic organic or inorganic compound operative to impart an odor index of less than about 0.75 to said melt-compounded composition.

Preferably the inventive articles are prepared from a melt-compounded polyolefin/mica composition prepared by way of a low temperature compounding process.

A preferred low temperature compounding process used for producing mineral-filled polypropylene melt-compounded compositions with an odor index of less than about 0.75 including a basic odor suppressing agent in accordance with the invention with from about 40 to about 90 percent by weight of a polypropylene polymer includes the sequential steps of: (a) preheating a polypropylene polymer while maintaining the polymer below a maximum temperature of about 370° F. and preferably below 350° F. and more preferably below a maximum of about 260° F.; but suitably above about 240° F.; followed by; (b) admixing mineral filler to said preheated polymer in an amount from about 10 to about 50 percent weight based on the combined weight of the resin and primary filler and maintaining the mixture below about 425° F.; followed by, (c) extruding the mixture. Polymer may be melted exclusively through the application of shear, or the shear may be supplemented through heating by infrared radiation or ordinary heating coils or performed externally to the mixing chamber. Preferably, the basic odor suppressing agent is added simultaneously with the mineral filler. It is desirable to keep the duration of the step of admixing mineral filler and a basic odor suppressant agent to the mixture relatively short so as not to generate compounds which cause odor and to preserve the particle size and aspect ratio of the mineral filler. Accordingly, the step of admixing the mineral filler should be no more than about five minutes with the duration of the admixing step of less than about three minutes being even more preferred. Any suitable means may be used to carry out the sequential process, however, the process is normally carried out in a batch mode in a mixing chamber provided with a pair of rotating rotors in an apparatus referred to in the industry as a Banbury type mixer. One may choose to use a twin screw extruder or a Buss kneader to practice the inventive process if so desired, provided that appropriate elements are used to minimize shear heating.

Thermoforming is typically conducted at a sheet temperature of from about 260° to about 310° F., and more preferably at a temperature of from about 280° to about 300° F.

There is provided in a still further aspect of the invention a crack-resistant, thermoformed food contact article having a wall thickness ranging from about 10 to about 80 mils consisting essentially of from about 40 to about 90 weight percent of a polypropylene polymer, from about 10 to about 50 percent by weight of a mineral filler, from about 1 to about 15 percent by weight polyethylene, from about 0.1 to about 5 weight percent titanium dioxide and optionally including a basic organic or inorganic compound. The basic compound is, generally speaking, the reaction product of an alkali metal or alkaline earth element with carbonates, phosphates, carboxylic acids as well as alkali metal and alkaline earth element oxides, hydroxides, or silicates and basic metal oxides, including mixtures of silicon dioxide with one or more of the following oxides: magnesium oxide, calcium oxide, barium oxide, and mixtures thereof. A particularly preferred article is where the basic organic or inorganic compound is calcium carbonate which is present in an amount of from about 5 to about 20 weight percent.

Polyethylene is more typically present from about 2.5 to about 15 weight percent, preferably from about 4 to about 5 weight percent of the crack resistant article. Titanium dioxide is included in various amounts, from about 0.1 to about 3 percent by weight being typical; from about 0.25 to 2 percent titanium dioxide may be included. Preferably, titanium dioxide is included in at least 0.5 percent by weight.

The caliper, or wall thickness, of the articles is usually from about 0.010 to about 0.050 inches or from about 10 mils to 50 mils. A caliper of from about 15 to 25 mils is most typically employed.

While any suitable polypropylene polymer may be employed, the most preferred polymer is isotactic polypropylene having a melt index in the range of from about 0.3 to 4, with a melt index of about 1.5 being typical. The polyethylene employed may be HDPE, LLDPE, LDPE or MDPE, mixtures thereof or a polyethylene with bimodal molecular weight distribution. Polypropylene is sometimes referred to hereafter as "PP".

The inventive compositions from which the crack resistant articles are made do not include coupling agents such as maleic anhydride containing polypropylene as further described herein, but may optionally include other components which do not alter the basic and novel characteristics of the crack-resistant plates. For example, nucleants such as sodium benzoate in amounts detrimental to crack resistance are to be avoided.

In a still further aspect of the invention there is provided a method of making a microwaveable mineral-filled polypropylene food contact article comprising preparing a melt-compounded composition comprising from about 40 to about 90 percent by weight of a polypropylene polymer and from about 10 to about 50 percent by weight of a mineral filler and optionally an effective amount of an odor-reducing compound. The melt-compounded composition exhibits a relative aroma index, relative to a corresponding composition consisting essentially of polypropylene and mica of less than about 0.75. The composition is extruded into a sheet and formed into a suitable food contact article. Preferably, the article consists essentially of polymer and mineral filler and excludes such components as excess anti-oxidants and the like.

Suitably the basic inorganic or organic compounds are selected from the group consisting of calcium carbonate, sodium carbonate, potassium carbonate, barium carbonate, aluminum oxide, sodium silicate, sodium borosilicate, magnesium oxide, strontium oxide, barium oxide, zeolites, sodium phosphate, potassium phosphate, magnesium phosphate, mixtures of silicon dioxide with one or more of the following oxides: magnesium oxide, calcium oxide, barium oxide, and mixtures of these or other basic inorganic or organic compounds such as sodium stearate, calcium stearate, potassium stearate, sodium citrate, potassium citrate, and mixtures of these basic organic compounds.

The function of the basic inorganic compound or organic compound is to minimize the formation of odor-causing compounds in the mineral-filled polyolefin composition and thus provide products with food contact compatible olfactory properties for consumer use. In this connection, the amount of the basic inorganic compound or organic compound added is controlled to be sufficient to reduce formation of decomposition products to sufficiently low levels to provide containers and plates with suitable food contact compatible olfactory properties. Suitably 5 to 15 weight percent of the container comprises the basic inorganic compound, advantageously about 8 to 12 percent. When the basic organic compounds are used, lower quantities are required, suitably from about 0.5 to 2.5 weight percent, advantageously 1.0 to 1.5 percent. Coupling agents and pigments may be utilized. Maleic anhydride and acrylic modified polypropylenes are suitable coupling agents for some embodiments.

Advantageously, the sheet is formed by an extrusion process utilizing a compounded polymer/mica basic inorganic compound or basic organic compound mixtures. The final extrusion process renders a sheet with excellent thermal properties, cut resistance, and food contact compatible olfactory properties.

Mica is easily cleaved into thin, relatively regular, flexible yet strong sheets (leaf-like flakes) with thickness in the range of half a micron and aspect ratio as high as 300. Mica is much softer than other inorganic fillers (wollastonite, glass) yet only slightly harder than talc. Mica has a slippery tactile feel and low abrasiveness relative to other common inorganic fillers.

The reinforcement effect at 40 weight percent mica is equivalent to that of 30 weight percent glass fiber. Hard inorganic fibrous fillers such as glass (various lengths) and wollastonite (acicular structures) have drawbacks in some respects such as abrasiveness and are prone to fracture degradation during conventional melt processing. Other fibrous (organic) fillers are derived from wood and vegetable sources and are not suitable for use in the manufacture of the plates of this invention since the organic fillers, when used in substantial amounts, tend to degrade during processing and they are also moisture sensitive.

In some applications it may be preferred to treat the mineral and/or basic inorganic compounds prior to using them in the inventive articles. A suitable compound for this treatment is amino-silane; sometimes referred to as a "coupling" agent.

Suitable basic inorganic and organic compounds used in the process include: calcium carbonate, sodium carbonate, sodium hydroxide, potassium carbonate, barium carbonate, aluminum oxide, sodium silicate, sodium borosilicate, magnesium oxide, strontium oxide, barium oxide, zeolites, sodium phosphate, potassium phosphate, magnesium phosphate, mixtures of silicon dioxide with one or more of the following oxides: magnesium oxide, calcium oxide, barium oxide, and mixtures of these or other basic inorganic or organic compounds such as sodium stearate, calcium stearate, potassium stearate, sodium citrate, potassium citrate, and mixtures of these basic compounds.

In the case where microwaveability is desired for a plastic disposable food contact article, the not so perfect solution has been the use of relatively expensive high heat modified polystyrene based or heat resistant materials (e.g., unfilled PPO and SMA engineering resins), where PPO refers to polyphenylene oxide and SMA refers to styrene-maleic anhydride copolymer.

Mica or another mineral filler and the basic inorganic compound or the basic organic compound filled polypropylene is compounded by pre-blending the polypropylene in pellet or flake form with mica powder and the basic inorganic compound or the basic organic compound powder and other additives (color concentrates, pigments, antioxidants, lubricants, nucleating agents, antistatic agents, etc.). This mixture is conveyed into the feed section addition point of a twin screw compounding extruder, or compounded in a Banbury-type mixer to provide a melt-processed polyolefin composition. Alternatively, the components are advantageously fed separately into the same or different points of addition, using combinations of volumetric and/or gravimetric (i.e., loss in weight type) feeders as further described herein.

For white pigmentation, titanium dioxide is preferred due to combination of brightness, and opacity, as well as stability during processing and final use. Surface treatment may be optionally used to further enhance wetting, dispersion, compatibility with matrix resins whereas the titanium dioxide forms may be of the rutile or anatase type. Alternate white pigments may also consist of calcined clay or blends of calcined clay with titanium dioxide. For black pigmentation, carbon black is preferred due to a combination of desirable characteristics such as blackness, and dispersibility, the latter of which can be carefully controlled by choice of particle size and surface chemistry. Carbon black is amorphous carbon in finely divided form which is made by either the incomplete combustion of natural gas (channel black) or by reduction of liquid hydrocarbons in refractory chambers (furnace black).

A twin screw extruder provides sufficient mixing action to effectively cause the wetting and dispersion of the filler into the polymer matrix. The twin screw extruder may be of the co-rotating or counter-rotating type, where each type is equipped with different screw flight elements which are appropriate for the feed, mixing, and melt metering zones. The discharge zone normally consists of a strand die where the exiting molten material strands are quenched in a circulating water bath followed by knife cutting into pellets. In a particularly preferred embodiment, a Banbury-type mixer is used for compounding the resin, mica and basic compound as further described herein.

Low molecular weight additives such as waxes, fluorinated polymers, and other specialty lubricants are suitably used as process aids to reduce the melt viscosity and improve throughput. Polyethylene resin may also be added to the blend. Other additives may include nucleating agents and antistatic agents. Antioxidants may be added in small amounts, generally less than one weight percent, to minimize shear and thermal degradation of the polypropylene during the extrusion and forming processes as well as to promote the chemical stability of the sheet prior to and during final article use. Suitable antioxidants are advantageously selected from the group of phenolics and phosphites and blends thereof. These are produced by Ciba-Geigy and General Electric Corporation. Plastic sheet extrusion equipment is suitable for the manufacture of multilayered or single layered mica or other mineral filler and the basic inorganic or organic compound filled sheets of a polyolefin selected from the group consisting of polypropylene, polypropylene/polyethylene copolymer or blend, and mixtures of these. Melt strength of the sheets is improved when mica is used as a filler since geometry of the mineral in the form of high aspect ratio flakes serves to provide "interparticle connectivity" or physical cross-linking. The food contact compatible olfactory properties are enhanced when in addition to the mica, basic inorganic compounds or organic compounds such as calcium carbonate, sodium carbonate, potassium carbonate, barium carbonate, aluminum oxide, sodium silicate, sodium borosilicate, magnesium oxide, strontium oxide, barium oxide, zeolites, sodium phosphate, potassium phosphate, magnesium phosphate, mixtures of silicon dioxide with one or more of the following oxides: magnesium oxide, calcium oxide, barium oxide, and mixtures of these or other basic inorganic or organic compounds such as sodium stearate, calcium stearate, potassium stearate, sodium citrate, potassium citrate, and mixtures of these are mixed with mica or other mineral filler and the polyolefin to produce the containers of this invention. Exemplary inorganic materials which may also be employed as a primary mineral filler include talc, barium sulfate, calcium sulfate, magnesium sulfate, clays, glass, dolomite, alumina, ceramics, calcium carbide, silica and so on. Many of these materials are enumerated in the *Encyclopedia of Materials Science and Engineering*, Vol. #3, pp. 1745–1759, MIT Press, Cambridge, Mass. (1986), the disclosure of which is incorporated herein by reference.

Mineral fillers are sometimes referred to by their chemical names. Kaolins, for example, are hydrous alumino silicates, while feldspar is an anhydrous alkali, alumino silicate. Bentonite is usually an aluminum silicate clay is and talc is hydrated mangesium silicate. Glass, or fillers based on silicon dioxide may be natural or synthetic silicas. Wollastonite is a calcium metasilicate whereas mica is a potassium alumino silicate. Mineral fillers are further discussed below. As noted above, clays may be employed as a primary filler. The two most common of which are kaolin and bentonite. Kaolin refers generally to minerals including kaolinite which is a hydrated aluminum silicate ($Al_2O_3.2SiO_2.2H_2O$) and is the major clay mineral component in the rock kaolin. Kaolin is also a group name for the minerals kaolinite, macrite, dickite and halloysite. Bentonite refers to hydrated sodium, calcium, iron, magnesium, and aluminum silicates known as montmorillonites which are also sometimes referred to as smectites. A large number of siliceous materials may also be employed as a primary filler. These materials include diatomite, perlite, pumice, pyrophillite, silica, and talc. These minerals typically consist of an alkali metal oxide or alkaline earth element oxide, and silicon dioxide together with a minor amount of water and other elements. Talc, for example, includes from about 25% to about 35% MgO, 35–60% $SiO_2$ and about 5% $H_2O$. These materials are further described below. Diatomite or kieselguhr is a sedimentary material formed by centuries of life cycles of aquatic diatoms, a simple plant in the algae family with an opaline silica cell wall. Thousands of species of diatoms have flourished and continue to do so in both marine and lacustrine environments. Fossilized skeletal remains of diatoms in commercial quantities are found in many parts of the world. Perlite is believed to result from hydration of volcanic glass or obsidian. Generally, hydration is about 2–5%; this water content is important to the expansibility of the perlite, influencing melting point and supplying expansion steam.

The rapid expansion of dissolved gases in silica lavas during volcanic eruptions produces the light density pumice or pumicite. The finer pumicite particles are transported by wind away from the source volcano, whereas pumice accumulates closer to the vent.

The hydrous aluminum silicate, pyrophilite, is formed by hydrothermal metamorphism of acid tuffs or braccias.

Silica sand is frequently obtained from the weathering of quartz-containing rock. Decomposition and disintegration of the rock with decomposition of other minerals leaves a primary quartz sand that has been concentrated by water movement. Induration of sands to sandstone results in another source for silica sand. Amorphous silica, or more properly cryptocrystalline or microcrystalline silica, is formed by the slow leaching of siliceous limestone or calcareous chert. Talc is formed by the metamorphic (hydrothermal) alteration of magnesium silicates such as serpentine, pyroxene or dolomite.

The siliceous fillers are generally inert in most applications as shown by pH values in the range from about 6–10.

Sulfate minerals, such as gypsum and barite may likewise be employed as a primary filler. Gypsum is the name given to the mineral that consists of hydrous calcium sulfate ($CaSO_4 \cdot 2H_2O$), and also to the sedimentary rock that consist primarily of this mineral. In its pure state, gypsum contains 32.6% lime (CaO), 46.5% sulfur trioxide ($SO_3$), and 20.9% water. Single crystals and rock masses that approach this theoretical purity are generally colorless to white, but in practice, the presence of impurities such as clay, dolomite, silica and iron imparts a gray brown, red or pink color to the rock.

There are three common varieties of gypsum: selenite, which occurs as transparent or translucent crystals or plates; satin spar, which occurs as thin veins (typically white) of fibrous gypsum crystals; and alabaster, which is compact, fine-grained gypsum that has a smooth, even-textured appearance. Most deposits or rock gypsum that are suitable for industrial purposes are aggregates of fine to coarse gypsum crystals that have intergrown to produce a thick, massive sedimentary rock unit that is 90–98% gypsum. Alabaster is highly prized because of its uniformly fine particle size, but the more common deposits of rock gypsum consisting of coarser-grained selenite can generally be crushed and ground to produce a suitable filler and coating material.

Gypsum has a hardness of 2 on the Mohs scale, and can be scratched with the fingernail. Large rock masses are easily crushed and ground to a fme powder. The specific gravity of gypsum is about 2.31 and the refractive index is about 1.53. Gypsum is slightly soluble in water but it is an inert substance that resists chemical change. The oil-absorption capacity of gypsum is fairly low (0.17–0.25 $cm^3 g^{-1}$).

Raw or crude gypsum is one of the forms used as fillers and coatings, but for some purposes calcined or deadburned gypsum is desired. In calcining, the gypsum is heated to abut 120–160° C. to drive off free water and partially remove the water of crystallization. The calcined material or stucco, has a chemical composition of $CaSO_4 \cdot \frac{1}{2}H_2O$, and it readily takes up water. Calcination at higher temperatures (500–725° C.) results in a product called deadburned gypsum, which has a composition of $CaSO_4$.

Anhydrite, a sulfate mineral and rock that is closely associated with gypsum in nature and has minor uses as a filler, in anhydrous calcium sulfate ($CaSO_4$) containing 41.2% CsO and 58.8% $SO_3$. It is typically fine grained (like alabaster), and occurs in thick, massive sedimentary rock units. Anhydrite usually is white or bluish gray when pure, but it may be discolored by impurities. Anhydrite has a hardness of 3.5, a specific gravity of 2.98, and a refractive index of 1.57–1.61.

Thus, fillers commonly include:
Barium Salt
Barium Ferrite
Barium Sulfate
Carbon/Coke Power
Calcium Fluoride
Calcium Sulfate
Carbon Black
Calcium Carbonate
Ceramic Powder
Chopped Glass
Clay
Continuous Glass
Glass Bead
Glass Fiber
Glass Fabric
Glass Flake
Glass Mat
Graphite Powder
Glass Sphere
Glass Tape
Milled Glass
Mica
Molybdenum Disulfide
Silica
Short Glass
Talc
Whisker
Particulate fillers, besides mica, commonly include:
Glass
Calcium carbonate
Alumina
Beryllium oxide
Magnesium carbonate
Titanium dioxide
Zinc oxide
Zirconia
Hydrated alumina
Antimony oxide
Silica
Silicates
Barium ferrite
Barium sulphate
Molybdenum disulphide
Silicon carbide
Potassium titanate
Clays
Whereas fibrous fillers are commonly:
Whiskers
Glass
Mineral wool
Calcium sulphate
Potassium titanate
Boron Alumina
Sodium aluminum
Hydroxy carbonate Suitably the extruded sheet includes coloring agents for aesthetic appeal, preferably titanium dioxide, carbon black, and other opacifying agents in the range of 0.5–8 weight percent based on total composition, preferably 1.5 to 6.5 weight percent. The extruded sheet comprises minor amounts of other additives such as lubricants and antioxidants. These articles of manufacture may be suitably colored with pigments or dyes. Pigments are defined as small insoluble organic or inorganic particles dispersed in the resin medium to promote opacity or translucency. Usual pigments include carbon black, titanium dioxide, zinc oxide, iron oxides, and mixed metal oxides. Dyes are organic and soluble in the plastic, and may be used alone or in combination with pigments to brighten up pigment based colors. All such colorants may be used in a variety of modes which include dry color, conventional color concentrates, liquid color and precolored resin.

Aroma Profile Test Method

The Sensory Analysis Center at Kansas State University has developed a profiling protocol in which a highly trained panel identifies specific odors and rates their intensity. The intensity scale is a 15-point "universal" scale of the type typically chosen for sensory studies, where 1 is barely perceptible or threshold and 15 is extremely strong. If an attribute or odor component is not listed in the tables which follow, it means it is not present and would score a 0. The panel members are selected on the basis of a series of screening tests that include basic taste, odor recognition, taste intensity recognition, taste intensity ranking, and a personal interview to evaluate availability and personality traits. Training, which includes the fundamental sensory principles and all aspects of the profile technique, is done over a 4–12 month period.

The panelists work as a group to arrive at a description of the product. Individual results are compiled by the panel leader and discussion follows in which disagreements are discussed until a consensus is reached on each component of the profile. Reference materials and more than one session usually are required in order to reach the consensus.

The procedure for resin is to place 40 ml. of resin in a 340 ml. glass brandy snifter, which is covered with a watch glass. Sheet samples are cut into two 2"×2"× sections and placed in the same size brandy snifter. In testing, panelists found that some samples had initial odor components that disappeared rapidly. Therefore an initial impact and a sustained impact were evaluated for each sample. The initial impact was judged immediately after the watch glass had been removed; the sustained impact was judged 10 seconds after the watch glass had been removed. Typical results are shown in the Table 4 below for Low Odor and High Odor Compositions. "Low" odor formulations were produced using lower melt processing temperatures in compounding and adding 10% calcium carbonate to the formulation.

TABLE 4

High Odor vs. Low Odor Polypropylene Composites:
Effect of Adding 10% $CaCO_3$
ODOR PROFILE FOR COMPOUNDED RESIN

| | Resin Impact | | Consensus Odor Profile on Resin (Kansas State University Sensory Analysis Center) | | | | | | | |
|---|---|---|---|---|---|---|---|---|---|---|
| Resin | Initial | Sustained | Petroleum | Pungent | Musty | Scorched | Medicinal | Sweet | Waxy | Soapy |
| High Odor | 9.0 | 3.5 | 8.0 | 4.0 | 7.0 | 3.5 | 3.0 | | | |
| Low Odor | 5.5 | 2.5 | 2.5 | | 4.5 | | | 1.5 | 2.0 | 4.5 |

| High Odor Resin | Low Odor Resin |
|---|---|
| 65.63% Polypropylene<br>30% Mica<br>2.5% Coupling Agent<br>1.87% Pigment | 55.63% Polypropylene<br>30% Mica<br>10% $CaCO_3$<br>2.5% Coupling Agent<br>1.87% Pigment |

High Odor and Low Odor compositions were compounded utilizing the process melt temperatures indicated in the first column of Table 5 and formed into sheets as described above. Thermoformed sheet was evaluated for aroma profile.

TABLE 5

ODOR PROFILE FOR SHEET FORMED
FROM COMPOUNDED RESIN AT TWO TEMPERATURES

| | Sheet Impact | | Consensus Odor Profile on Sheet | | | | | | | |
|---|---|---|---|---|---|---|---|---|---|---|
| Resin | Initial | Sustained | Petroleum | Pungent | Musty | Scorched | Medicinal | Sweet | Waxy | Soapy |
| High Odor 370° F. | 12.0 | 6.0 | 10.0 | 8.0 | 7.5 | 4.5 | 4.0 | | | |
| High Odor 459° F. | 11.0 | 8.0 | 7.5 | 7.5 | 6.0 | 3.5 | 2.0 | | | |

TABLE 5-continued

ODOR PROFILE FOR SHEET FORMED FROM COMPOUNDED RESIN AT TWO TEMPERATURES

| | Sheet Impact | | Consensus Odor Profile on Sheet | | | | | | | |
|---|---|---|---|---|---|---|---|---|---|---|
| Resin | Initial | Sustained | Petroleum | Pungent | Musty | Scorched | Medicinal | Sweet | Waxy | Soapy |
| Low Odor 371° F. | 5.5 | 2.0 | 3.5 | | 4.0 | | | 2.0 | 2.5 | 2.5 |
| Low Odor 460° F. | 5.5 | 2.0 | 3.0 | | 3.5 | | | 2.0 | | 3.5 |

The foregoing data demonstrates that: when a basic moiety containing compound was added to the mica polyolefin composition, a resin was produced having suitable food contact compatible olfactory properties. Significant decreases in the initial and sustained odors were observed and the scorched, pungent, and petroleum aroma components were removed or greatly reduced and these undesirable components seem to be replaced with sweet, waxy, and soapy aroma components.

When compounded pellets are subjected to sheet extrusion, those without calcium carbonate increase in the disagreeable components (pungent and petroleum) and increase in the initial and sustained odor output with subsequent processing. In contrast, when pellets contain calcium carbonate, no increase in undesirable aroma components was observed and no increase in the initial or sustained odor was produced with subsequent processing. Test panel data correlated well with analytical techniques as can be seen from the discussion and examples which follow.

C8/C9 Ketones

The precise nature of the odor causing compounds in polypropylene/mica compositions is not known; however, it has been found that undesirable odors correlate well with eight carbon (C8) and nine carbon (C9) alkyl ketones as described hereinafter, and may be associated with such compounds. A Likens-Nickerson steam/methylene chloride extraction technique was used to extract possible odor causing compounds from polypropylene/mica compositions and produce a concentrate. The extraction was performed until complete. The concentrate was analyzed through gas chromatography/mass spectrometry to produce chromatograms. The C8/C7 ratios referred to hereinafter are ratios of the abundance at the peaks assigned to be 4-methyl-2-heptanone to the abundance at the peak assigned to be 4-heptanone as measured by Likens-Nickerson extraction followed by gas chromtography/mass spectrometry.

Generally, "low odor" compositions reduce concentration of C8 and C9 ketones over "high odor" compositions by $\frac{2}{3}$ with $\frac{1}{5}$ being typical and $\frac{1}{10}$ being preferred. Thus, in general, melt-compounded compositions useful in connection with the invention have extractable concentrations of C8 and C9 alkyl ketones of less than about 3.5 ppm (weight) with less than 2 ppm being typical and less than 1 ppm being particularly preferred. Thus, the C8/C7 ratio can be used as an alternative indicator of desirable olfactory characteristics. Typically, "low odor" compositions useful in connection with this invention have a C8/C7 ratio at least five times less than high odor compositions with at least ten times less being typical. In preferred compositions, C8/C7 ratios as measured by Likens-Nickerson extraction followed by gas chomatography/mass spectrometry are generally less than about 0.5 or so as is seen from in the examples which follow. C8/C7 ratios of less than about 0.3 are typical and C8/C7 ratios of less than about 0.1 are particularly preferred. The plates of the invention and the pellets from which they are made are further characterized by an odor index which is determined by commercially available equipment in accordance with the procedure detailed below.

Odor Index

Preferred melt processed compositions, particularly extruded pellets from which articles such as plates and bowls are made, characteristically exhibit relatively low odor as opposed to conventionally formulated mineral/polypropylene compositions. Generally the odor index (as defined herein) is less than about 0.75, with less than or equal to about 0.6 being preferred. In general, the lower the odor index, the lower the odor intensity of the mineral-filled/polypropylene pellets. Less than or equal to about 0.5 is most preferred with a practical lower limit believed to be somewhere around 0.1 or so. Thus, preferred melt compositions will generally have an odor index of less than about 0.75 and typically from about 0.60 to about 0.1.

The odor index of a particular melt-processed composition is readily determined using conventional materials and equipment.

The odor index is defined as the arithmetic average of all sensor integrals for a given mineral-filled polypropylene sample including both a primary mineral filler and calcium carbonate or other odor suppressing compound divided by the arithmetic average of all integrals for a filled polypropylene sample including a primary mineral filler, but no odor suppressing basic compound, or in equation form:

$$\text{Odor Index} = \frac{\text{average readings of pellets including a primary mineral filler and calcium carbonate or other odor suppressing compound}}{\text{average readings of pellets including mineral filler only without an odor suppressing basic compound}}$$

A commercially available "electronic nose" aroma scanning device is used. Typically, such devices utilize a plurality of conductivity sensors to determine the odor of a sample. The particular device used in the discussion which follows uses 32 sensors whose response is integrated over time. The various integrals are averaged for each sample and the single value is used in the numerator and the denominator of the above equation.

A sample of preferred material for the present invention is described in Table 6 and following.

TABLE 6

Index Numerator Composition

| Component | Manufacturer | Product Number | Amount (Wt. Percent) |
|---|---|---|---|
| Polypropylene | Exxon | Escorene 4772 | 55.63 |
| Mica | Franklin Industrial Minerals, Inc. | L-140 | 30.0 |

TABLE 6-continued

Index Numerator Composition

| Component | Manufacturer | Product Number | Amount (Wt. Percent) |
|---|---|---|---|
| Calcium Carbonate | Huber | Q-325 | 10.0 |
| Coupling Agent | Aristech | Unite NP-620 | 2.5 |
| Titanium Dioxide | Tioxide | TR-23 | 1.87 |

The above components were extruded on a 90 mm Berstorff Co-Rotating Twin Screw Extruder with underwater pelletizing under the following conditions:
200 rpm screw speed with the following set temperature profile:

Zone 1—510° F.
Zone 2—485° F.
Zone 3—400° F.
Zone 4—380° F.
Zone 5—380° F.
Zone 6—380° F.
Head Flange—425° F.
Screen Changer—425° F.
Die—440° F.
Throughput appx. 900 LB/HR to produce pellets, the odor values of which are used in the numerator of the above equation.

The preferred instrument to perform the aroma intensity measurements is an AromaScang model A32 (AromaScan, Hollis, N.H., USA). This instrument employs a dynamic head space type of measurement, in which nitrogen gas flows through a sample vial and carries aroma volatiles to the sensors. All pellet samples are analyzed in triplicate with the final results averaged to minimize measurement noise. In the illustrations which follow, The "Acquisition Parameters" method of the instrument is set with a sampling interval of 1 and a detection threshold of 0.2. The "Multisampler-SP" method of the instrument sets the platen temperature (100° C. for the examples herein). Two other temperatures (115° C. and 125° C.) are automatically set. The Multisampler-SP method is also used to set the parameters in Table 7 to measure aroma intensity.

TABLE 7

AromaScan ® Settings

| Sample Equilibration Time: | 5 minutes |
|---|---|
| Vial Size: | 22 ml |

TABLE 7-continued

AromaScan ® Settings

| Mix Time: | 0 |
|---|---|
| Mix Power: | 1 |
| Relative Humidity: | 10% |
| Sampling Time: | 4 minutes |
| Wash Time: | 5 minutes |
| Data Collection Time (minutes): | 19 |
| Time Between Injections (minutes): | 20 |

In the recognition window, start and end are set at 1. In addition to the foregoing, the "Vial Pressurization Control" is set at 20 kPa, the "Vial Needle Flow" is set at 50 ml/min nitrogen; "Transfer Line Flow" across the sensors, between, before and after samples is set at 150 ml/min. All gas flows are for dry nitrogen.

A response of each of the 32 sensors of the AromaScan® machine is integrated over a time interval of 55–150 seconds. The initial 55 seconds is allowed to let humidity/moisture exit the system to a great extent before integration is started. The 150 second integration end time was chosen to allow the sensor signals to return to baseline, at which time all significant signal has been integrated. The various signals seen after 150 seconds are insignificant in terms of the odor measurement.

Using the foregoing procedure and composition, 2.0 grams of compounded polymer pellets are weighed and placed in the 22 ml, crimp top, septum capped vials and analyzed automatically by the instrument. A denominator, or reference sample is prepared as described in connection with Tables 7 and 8, except that no calcium carbonate is used; i.e. the sample has 65.63% polypropylene. Through the use of an automated instrument, the odor intensity of the melt-compounded pelletized composition can be reduced to a single value. While the foregoing sets forth a particular and preferred method of determining the odor intensity index, it may also be possible to employ other instruments consistent with this protocol since such instruments are readily available. If such alternative instrument is employed the standard composition detailed above should be used to ensure that calibration is proper. As noted, the reference or denominator composition is prepared by substituting polypropylene for the calcium carbonate (or other basic compound) of the numerator composition.

A series of resin compositions and sheet products were prepared in accordance with the discussion above and characterized by C8/C7 ketone ratio and odor panel testing. Variables included calcium carbonate addition, process atmosphere (air or nitrogen) and process melt temperature. Results appear in Table 8.

TABLE 8

$CaCO_3$ Effect of Process Conditions and Compositions on Odor of PP/Mica Composites

| | | | | | Odor Panel Data | |
|---|---|---|---|---|---|---|
| Type (Banbury or Extruded Sheet) | Process Atmosphere (Air/$N_2$) | $CaCO_3$ (Yes/No) | Process Melt Temperature | $C_8/C_7$ Ketone Ratio | Sustained (Total Intensity) | "Scorched" Odor Profile Component Intensity |
| Brabender Banbury Compounded | Air | Yes | 370° F. | 0.055 | 2.0 | 0 |
| Brabender Banbury | Air | Yes | 460° F. | 0.6 | 4.0 | 5.0 |

TABLE 8-continued

CaCO₃ Effect of Process Conditions and Compositions on Odor of PP/Mica Composites

| Type (Banbury or Extruded Sheet) | Process Atmosphere (Air/N₂) | CaCO₃ (Yes/No) | Process Melt Temperature | $C_8/C_7$ Ketone Ratio | Sustained (Total Intensity) | "Scorched" Odor Profile Component Intensity |
|---|---|---|---|---|---|---|
| | | | | | Odor Panel Data | |
| Compounded Sheet | N₂ | Yes | 460° F. | 0.3 | | |
| Brabender Banbury | Air | Yes | 460° F. | 0.6 | 4.0 | 5.0 |
| Compounded Sheet | Air | Yes | 370° F. | 0.15 | 2.0 | 0 |
| Sheet | Air | No | 370° F. | 1.3 | 6.0 | 4.5 |
| Sheet | Air | Yes | 400° F. | — | 5.0 | 2.5 |
| Sheet | Air | No | 460° F. | 0.9 | 8.0 | 3.5 |
| Sheet | Air | Yes | 460° F. | 0.7 | 2.0 | 0 |

See discussion above for $C_8/C_7$ ketone ratio, odor; Kansas State University Odor Panel Profile.
Extruded Sheet was prepared using a single screw extruder with pre-compounded resin made by a twin screw process.

Some of the resins were prepared on a Brabender device (C. W. Brabender, model EPL2V5502) with a Banbury mix head (model R.E.E.6, 230v, 11a) with a mixing time of 5–10 minutes as indicated.

The other sheet samples were prepared from precompounded resin pellets extruded under the conditions shown in Table 9.

TABLE 9

Sheet Extrusion Conditions for PP/Mica Pilot Extruder

| CONDITIONS | ACTUAL | SET POINT |
|---|---|---|
| Barrel Zone 1 (° F.) | 354–378 | 360–375 |
| Barrel Zone 2 (° F.) | 366–410 | 370–410 |
| Barrel Zone 3 (° F.) | 371–460 | 370–460 |
| Adapter temp (° F.) | 359–460 | 370–460 |
| Feed Block Temp (° F.) | 370–468 | 370–460 |
| Die Zones 1–3 temps (° F.) | 368–462 | 370–460 |
| Extruder RPM | 110 | 110 |
| Drive Amperes | 15–23 | — |
| Melt Pressure (psi) | 1050–1850 | — |
| Die Pressure (psi) | 745–910 | — |
| Line Speed (FPM) | 8.25–9.74 | — |
| Chill roll temp. (° F.) | 130 | — |

The odor of PP/mica composites (pellets or sheet) is affected by temperature, atmosphere, and by the addition of a basic filler such as CaCO₃. The C8/C7 ketone ratio is consistent with the odor panel data and shows that offensive odor components decrease with:

Using lower processing temperatures

Using a base such as CaCO₃ as a buffering agent

Processing under inert atmosphere such as N₂.

Particularly preferred, low odor compositions are prepared by way of a sequential process in a Banbury mixer at relatively low temperatures. It has been found that melt compositions prepared in a sequential Banbury process exhibit superior stiffness as measured by flexural modulus properties and low odor. In a preferred sequential process, two feed steps are used in order to minimize the time heated or molten polypropylene is in contact with the mica or other mineral filler.

TABLE 10

Comparison of Compounding Processes

| COMPOUNDING PROCESS | Compound Flexural Modulus (Tangent), PSI | 9" Plate Rigidity (g/0.5") | Odor Index; Approximate (Compound) |
|---|---|---|---|
| Twin Screw | 718,000 | 417 | 0.625 |
| Banbury (non sequential) | 591,000 | 378 | 0.375 |
| Banbury (sequential, 1 min. pre-heat) | 708,000 | 416 | 0.41 |
| Banbury (Sequential, 2 min. premelt | 635,000 | 352 | 0.3875 |

Table 10 shows compound flexural modulus (as measured by ASTM method D 790-95a), corresponding plate rigidity, and aroma intensity index on four indicated compounding processes. In the case of twin-screw, high modulus is obtained but with higher odor with relatively low throughput, in the range of 900 lb/hr, which is less than half the output of Banbury compounding processes (utilizing a Stewart-Bolling Banbury Mixer with batch sized in the range of 150–200 lb) listed herein. In the case of non-sequential Banbury process, low modulus is obtained with corresponding low plate rigidity with lower odor and high throughput. In the last two cases corresponding to sequential Banbury processes designated as "1 min. pre-heat" and "2 min. pre-melt", the short 1 minute preheat case is preferred because it gives high compound modulus and high plate rigidity (comparable to twin screw case) with benefits of both low odor and high throughput, in excess of 2000 lb/hr.

The twin screw formulation in the above table contains PP/30% mica/10% CaCO3 with 2.5% coupling agent (maleic anhydride modified PP grade Aristech Unite NP -620) and no polyethylene. The formulation corresponding to all three listed Banbury processes in above table contain PP/30% mica/10% CaCO3/0.5% TiO2/4%LLDPE with no coupling agent where such ingredients have the following sources and grades: Mica=Franklin Minerals L-140, CaCO₃=Huber Q325, PP=Exxon Escorene PP4772, LLDPE=Novapol Novachemical G1-2024A.

The Banbury "non-sequential" case in Table 10 corresponds to adding all ingredients together with a total compounding time of about 4.5 minutes followed by conversion of the batch (having temperature of 430° F.) to pellets using a continuous 10" single screw extruder equipped with one 30 mesh and one 20 mesh screen, and an underwater pelletizing die assembly, with a pelletizing temperature in the range of 455–470° F.

The Banbury "sequential 2 min premelt" case in Table 10 corresponds to a 2 minute period for melting the PP/LLDPE mixture (in the presence of $CaCO_3$ and $TiO_2$) to a maximum temperature of about 350° F., followed by adding mica and thereafter mixing for a period of about 105 sec to achieve a batch temperature of about 430° F., followed by conversion to pellets with a pelletizing temperature of about 460° F. The Banbury "sequential, 1 min pre-heat" case in Table 11 corresponds to about a 1 minute period for presoftening the PP/PE mixture (in the presence of $TiO_2$, or alternatively adding the $TiO_2$ with the mica and calcium carbonate) to a maximum temperature of about 260° F., followed by adding the mica/$CaCO_3$ mixture and thereafter mixing to achieve a batch temperature of about 425° F., followed by conversion to pellets with a pelletizing temperature of about 425° F. In this preferred mode, it has been found that polymer preheating aids in preserving compound stiffness (required for rigid articles of manufacture) and intimate contact of mica with odor suppressing agent ($CaCO_3$) aids the production of low odor material.

Pellets from the above mentioned Banbury compounding processes were subsequently extruded at 370° F. as cast sheets in the range of 17–18 mil. Sheet line conditions also included a screw RPM value of 100, a chill roll temperature of about 130° F., drive amperage value of about 22, melt pressure of about 2000 psi, die pressure of about 970 psi, and a line speed of about 7 ft/min. Plates were subsequently vacuum thermoformed using a female mold and trimmed and tested for rigidity.

Physical Properties, Heat Resistance and Food Contact Suitability

TABLE 11

MICROWAVE COOKING TEST RESULTS FOR PLATES J AND S

| FOOD TYPE | PLATE TYPE | |
| --- | --- | --- |
| | J | S |
| Donut | Pass | Sugar glazing sticks |
| Broccoli/cheese | Pass | Significantly deforms |
| Pepperoni pizza | Pass | Moderate deformation, Staining |
| Barbecue pork | Slight stain | Significant stain/warpage |
| Pancake/syrup | Pass | Significant warpage |
| Beans & pork | Pass | Significant warpage |
| Butter | Slight warpage | Significant warpage |
| Bacon | Moderate warpage Localized melting, no leak | Significant warpage Rubbery plate flows and Sticks to glass tray |

Microwaveability

Fort James Corporation (J) plate specimens made of mica-filled polypropylene plates manufactured by Solo Cup Company (S) were tested in the microwave (Samsung model MW 8690) with a variety of foods. The highest power setting (10) was used in all cases and cooking/heating times and procedures corresponded to food manufacturer instructions on the packages. Most tested foods were of the frozen microwaveable type and were placed in a semi-thawed state directly on plates prior to cooking. When appropriate, a loose covering of wax paper was employed during the cooking process. After cooking, the plates were gently washed with warm water and inspected. The following are the detailed test results which are also summarized in above Table 11.

Test #1 Results—Sugar Glazed Donut

J A large, oval shaped sugar glazed plain donut was microwaved on a mica-filled polypropylene plate for 60 seconds. The sugar glazing melted, bubbled, and flowed on the plate. The boiling sugar and grease mixture caused the bottom of the plate to feel very warm but the plate exhibited no warping, no staining, no softening, and no soak-through. The plate was cool enough to be safely handled. The residue of the donut was easily washed off and the appearance of the used plate was excellent.

S The bottom of the plate got hot and slightly deformed with no soak-through, however, sugar stuck to the plate.

Test #2 Results—Broccoli with Cheese Sauce

J Green Giant 10 oz. Broccoli with cheese sauce was removed from the flexible pouch and heated for five minutes in the microwave on the plate with loose covering of wax paper. The cheese melted and bubbled on the plate without sticking. The plate bottom was warm, but no soak-through and no loss of dimensional stability was observed. After washing, no staining was observed and the appearance of the used plate was excellent.

S The plate bottom got hot and significantly deformed with no soak-through.

Test #3 Results—Pepperoni Pizza

J Tombstone 7 oz. Pepperoni pizza was cooked on an uncovered plate for 4 minutes. The cheese melted and started bubbling about halfway through the test. The molten cheese mingled with the hot liquid fat extruded from the pepperoni and dripped on the sides of the crust onto the plate. No sticking, no soak-through, no staining, and no loss in plate dimensional stability was observed and the appearance of the used plate was excellent.

S The plate bottom got hot and moderately deformed with no soak-through. The greasy reddish stain from oil in pepperoni could not be completely washed off.

Test #4 Results—Microwave Kid Meal

Pork Rib Patties, Barbecue Sauce, Fries, Honey Corn Bread

J A quick meal preparation simulation test was conducted using a Swanson 7.2 oz. microwave kids' meal with ingredients consisting of partially cooked boneless pork rib patties, barbecue sauce, fries, and honey corn bread. The food was transferred from the compartmented tray onto the plate. Sauce was spooned on top of the pork meat and was allowed to drip on the sides of the patties and onto the plate. The cornbread batter was spooned out and was placed on the plate next to the fries. The food was loosely covered with wax paper and cooked for 3.5 minutes. Examination after microwaving showed that the cornbread was fully cooked and there was no sticking or damage to the plate. The fries and pork meat with sauce caused no soak-through and no loss in plate dimensional stability. Washing of plate revealed the presence of slight staining from barbecue sauce. Overall, the appearance of the used plate was very good.

S The plate bottom deformed mainly from pork meat with considerable staining from the barbecue sauce without soak-through.

Test #5 Results—Beans with Pork and Tomato Sauce

J Beans with pork and tomato sauce (8 oz. Can) were placed on the plate, covered with wax paper and heated for 2 minutes near boiling. The bottom of the plate got hot, but the rim was cool to touch. The hot plate bottom exhibited no bulging and also, when the hot food plate was handled by the rim there was no perceived loss in dimensional stability. No soak-through, no warping and no staining was observed. The appearance of the plate was excellent.

S The plate bottom became very hot and severely deformed with no soak-through and when handled by the rim, the plate felt like it had low rigidity.

Test #6 Results—Pancakes with Syrup and Precooked Bacon

J In this test, Swanson microwave pancakes and bacon breakfast (4.5 oz. size) were used. The semi-thawed meal consisted of three pancakes and three partially, precooked bacon strips. The pancakes and bacon were removed from the tray in carton and placed on plate. Approximately 5 teaspoons of pancake syrup was spooned over the pancakes and the assembled meal was covered with wax paper and microwaved for 2 minutes. Although the bottom of the plate got hot, the overall plate performance was excellent, i.e. no warpage, no soak-through, no loss in dimensional stability, and no staining. Some hot grease was exuded by the bacon during crisping but there was no observed damage to the plate. The appearance of the used plate was excellent.

S The plate bottom became hot and significantly deformed (especially in areas where bacon was placed), but no soak-through was observed and when handled by the rim, the plate felt soft.

Test #7—Butter

J Butter (5-tsp. chunk) was placed on the plate and was loosely covered with wax paper and was microwaved for 3 minutes. The butter melted completely and covered the whole plate bottom. The butter began boiling toward the end of the test. The plate bottom got very hot and became slightly warped but no soak-through. The rim of the plate felt cool to touch enabling safe removal of the plate from the microwave oven. A small portion of the butter became charred but was easily washed off the plate. Overall plate performance was good.

S The plate bottom became very hot and was significantly warped but no soak-through was observed and the greasy film residue could not be washed off completely. Plate felt soft and rubbery when handled by the rim.

Test #8 Results—Bacon

J Three strips of raw, cured bacon were wrapped in three sheets of paper towel and cooked for 5 minutes. All of the bacon became crispy and about 20% of it was charred. The bottom of plate got very hot but most of the rim area was relatively cool to the touch. Grease exuded from bacon and soaked through the towel. The grease pooled on the plate bottom, side and on some rim areas. The grease which pooled in some rim regions caused localized melting of the plate but no holes were formed. The hot grease which pooled on plate bottom caused significant warpage but no soak-through. Overall plate performance for Test #8 was less satisfactory than Test #7.

S When the raw bacon was wrapped in paper toweling and cooked on the S plate, the bottom became very soft and stuck to the glass tray in the microwave. Under such hot grease conditions, the adhering polymer regions underwent localized melting and stretched when the plate was lifted off the glass tray. The plate was severely warped but no holes formed and no soak-through was noticed.

With the possible exception of raw bacon, the behavior of the mica-filled polypropylene J plates in the microwave oven is considered excellent with a variety of aqueous, greasy/fatty, sugary food combinations. No unusual or off odors were detected during and after cooking for each type of food directly on the plate.

Crack Resistance

Low temperature crack resistance of rigid plates is of paramount importance when considering that product must survive during storage and shipping to point of sale. Normally, it is difficult to improve crack resistance or reduce brittleness of rigid polymeric materials without reducing the stiffness which is usually the case when introducing excessive amounts of softer extensible materials such as polyethylenes, rubber modified resins and the like. In order to be successful in imparting crack resistance without significantly reducing stiffness, one must add relatively low amounts of polyethylene or rubber modified additives, generally in the range of several to about 5 wt %. However, this invention shows that addition of low levels of polyethylene alone is not sufficient to promote crack resistance whereby the desired result is produced by a synergistic binary combination of polyethylene and $TiO_2$. Such low odor products have high crack resistance which renders them useful in the commercial sense.

There is provided in a still further aspect of the invention toughened, crack resistant articles. It has been found that polypropylene/mineral/polyethylene/titanium dioxide formulations without a coupling agent resist cracking. Generally, the articles have the components set forth in Table 12, in the amounts mentioned above. In Table 12, it is demonstrated that polyethylene/titanium dioxide exhibit synergy in resisting cracking.

TABLE 12

Low Temperature crack data for 9 inch plates made of PP/30% mica/10% $CaCO_3$ modified with various combinations of $TiO_2$, polyethylene, or coupling agent

| $TiO_2$ (wt %) | LLDPE (wt %) | HDPE (wt %) | Coupling Agent (wt %)* | Percent Cracked plates at 0° F.** |
|---|---|---|---|---|
| — | 4 | — | — | 100 (n = 5) |
| — | — | — | 2.5 | 100 (n = 5) |
| 1.9 | — | — | — | 100 (n = 5) |
| — | 4 | — | 2.5 | 100 (n = 5) |
| 1.9 | 0 | 0 | 2.5 | 100 (n = 5) |
| 0.5 | 4 | — | 2.5 | 60 (n = 5) |
| 0.5 | 4 | 0 | 0 | 0 (n = 5) |
| 0.5 | 0 | 4 | 0 | 0 (n = 10) |

*coupling agent is maleic anhydride modified PP grade Aristech Unite NP-620. Other ingredients are: Mica = Franklin Minerals L 140, CaCO3 = Huber Q325, PP = Exxon Escorene PP4772, LLDPE = Novapol Novachemical G1-2024A
**percentage of plates which cracked at 0° F. for specimen sets comprised of the indicates number n Crack resistance was evaluated in the laboratory according to method set forth below which was found useful as an investigative tool for optimizing the formulation with various combination of $TiO_2$, polyethylene, or coupling agent. A laboratory procedure was devised and used to evaluate the crack resistance of plates. Specifically, following is a description of test instruments and associated fixtures used to subject plates to a repeatable rim crushing force. The model numbers of standard equipment used on this procedure are recited below and additional fixtures used in these tests were employed as follows:

Instron—Model #55R402 was used which was equipped with Instron Environmental Chamber Model #3111. The Instron environmental chamber—Model #3111 was modified to control low temperatures with liquid nitrogen. It was equipped with a control solenoid mounted on the rear of the cabinet and an electronic control module mounted on the control panel assembly. The temperature within the chamber was controlled in relationship to the setpoint on the front panel temperature dial. A thermocouple within the chamber provides feed back to the device. A mercury thermometer was placed in the chamber and oriented so that temperature within the chamber was visible through an insulated glass door. It was monitored and adjusted to 0° C. using the panel temperature dial. A push rod was attached to the load cell of the instron and was passed through an opening in the top of the environmental chamber. A circular metal device measuring 100 mm in diameter and 10 mm in thick was attached to the end of the push rod inside the chamber. This circular metal device was used to contact the edge of a plastic plate during testing.

The plate support fixture was placed on a circular metal base support which measured 140 mm in diameter by 14 mm thick. This metal base support was located just above the inside floor of the environmental chamber. It was attached to a support rod that passes through the floor of the environmental chamber and attached to the base of the instron. Centering stops were provided on the metal base support so that the plate support fixture could be repeatedly placed at the same location in the environmental cabinet.

The plate support fixture is constructed of 5-mm thick sheets of plexiglas. The main base of this fixture measures 100×125 mm. The 125-mm dimension represents the width of the front of the mixture. The edge of the 125 mm side of a second plexiglas panel measuring 160×125 mm was permanently attached to the plexiglas main base. This panel was attached at a 90° angle to the main base and 35 mm in from the front edge. An L shaped plexiglas component was attached to the main base behind and parallel to the permanent panel by thumbscrews. Two 20-mm long slots were provided in the base of the L shaped component to allow attachment and provide movement for adjustment to hold the test plate. The short leg or base of the L shaped component faces the rear of the fixture. A block measuring 40×25×15 mm thick was permanently attached at the upper most end at the center of the L shaped component. This block is located on the front side of the moveable component or just opposite the short leg of the L shaped component, while an adjustable plate stop was attached to one side of the moveable L shaped component.

The methodology for testing the crack resistance of plates was as follows. The test plate was secured in a vertical position on edge in the plate support fixture. The bottom of the test plate was placed against the permanently attached plexiglas panel of the plate support fixture. The thumbscrews were loosened on the moveable portion of the plate support fixture. The L shaped moveable component was moved toward the plate. The plate was held in a vertical position by the fixed plexiglas panel and the block which was attached to the wall of the L shaped moveable component.

The plate stop located on the L shaped moveable component was adjusted so that the center of the plate would align with the center of the plate support fixture. The plate support fixture along with the test plate secured in a vertical position was placed on the metal base support in the environmental chamber. The instron was adjusted so that the push rod crush assembly was located 0.5 inches above the plate edge.

Prior to the test, the environmental chamber was adjusted to 0° F. After placement of the plate support fixture along with the test plate secured in a vertical position in the environmental chamber, the chamber had to re-establish 0° F. This time period was about 30 seconds. After re-establishment of the test temperature, the plate was conditioned for an additional five minutes prior to the test. The crosshead speed of the instron was set at 40 inches per minute. After the five minute conditioning time period, the instron was activated and the edge crushing force applied. A set of five or a set of ten replicate plates was tested for each condition. The total number of plates tested and the total number plates showing rim crack failure for each condition tested are reported in Table 12. In addition, the percentage of plates which cracked was calculated as shown above. The above formulations for crack resistance testing were compounded in the temperature range of 400 to about 425° F. on commercial Banbury equipment using batch sizes in the range of 150–200 lb. and nominal mixing times of 3 min. followed by underwater pelletizing.

Pellets were subsequently extruded at 370° F. as cast sheets in the range of 18 mil. Sheet line conditions also included a screw RPM value of 100, a chill roll temperature of 130° F. Plates were subsequently vacuum thermoformed using a female mold, trimmed, and thereafter tested for crack resistance.

Data on Examples 63 through 65 show that presence of $TiO_2$, polyethylene, or coupling agent alone is not sufficient to promote crack resistance of plates comprised of PP/mica/$CaCO_3$. In addition, data on Examples 66 and 67 show that binary combinations of polyethylene with coupling agent or $TiO_2$ with coupling agent are two cases which are also not sufficient for imparting crack resistance. Futhermore, the tertiary combination of $TiO_2$, polyethylene, and coupling agent also does not impart sufficient crack resistance, as evidenced by the majority of samples which exhibit cracking. Rather, the useful additive packages comprise the binary system of polyethylene (either LLDPE or HDPE) with at least 0.5 wt% $TiO_2$ whereby crack resistance is excellent as evidenced by no cracked samples.

Additional plates were fabricated in accordance with the foregoing procedures and compositions; crack testing results appear in Table 13 below.

TABLE 13

Crack Data and Physical Properties for Various Compounded Formulations
Base Formulation: PP/30% Mica/10% $CaCO_3$

| Formulation | | | Melt Flow | Filler | Flexural Modulus | 9" Plate | Product | Crack Data |
|---|---|---|---|---|---|---|---|---|
| $TiO_2$ (wt. %) | PE (4 wt. %) | Coupling Agent* | g/10 min. @230° C. | Content (Wt. %) | Tangent (psi) | Rigidity (grams/0.5") | Weight (grams) | @0° F. (#Cracked Total) |
| 0 | LLDPE | No | 1.45 | 39.4 | 505,000 | 288 | 19.3 | 5/5 |
| 1.9 | LLDPE | No | 1.64 | 40.6 | 581,600 | 422 | 23.13 | 0/5 |
| 1.2 | LLDPE | No | 2.05 | 39.8 | 578,500 | 385 | 22.12 | 0/5 |
| 0.5 | LLDPE | No | 1.77 | 38.6 | 487,500 | 286 | 20.65 | 0/5 |

TABLE 13-continued

Crack Data and Physical Properties for Various Compounded Formulations
Base Formulation: PP/30% Mica/10% CaCO₃

| Formulation | | | Melt Flow | Filler | Flexural | | | Crack Data |
| --- | --- | --- | --- | --- | --- | --- | --- | --- |
| TiO₂ (wt. %) | PE (4 wt. %) | Coupling Agent* | g/10 min. @230° C. | Content (Wt. %) | Modulus Tangent (psi) | 9" Plate Rigidity (grams/0.5") | Product Weight (grams) | @0° F. (#Cracked Total) |
| 1.9 | HDPE | No  | 1.5 | 40.6 | 637,500 | 436 | 22.70 | ⅕ |
| 1.9 | 0     | Yes | 1.9 | 39.0 | 717,585 | 417 | 21.25 | ⅗ |
| 1.9 | LLDPE | Yes | 1.6 | 39.6 | 494,000 | 391 | 21.6  | ⅗ |
| 1.9 | 0     | Yes | 1.2 | 40.3 | 593,000 | 353 | 20.8  | ⅗ |

*When present, coupling agent concentration is 2.5%

Materials useful for the inventive plates are provided by way of preparing a melt-compounded composition with from about 40 to 90 percent of a polypropylene polymer, about 10 to about 50 percent by weight of a mineral filler and optionally an effective amount of an odor-reducing compound. The melt-compounded composition is extruded into a sheet and formed into a food contact article and is characterized by a relative aroma index, relative to a composition containing 30 weight percent mica only, of less than about 0.75; preferably less than about 0.6. The relative aroma index is thus defined similarly as above; however, relative to a mica composition without an odor suppressing compound such as calcium carbonate. Stated another way, the relative aroma index is determined in the same way as the odor index utilizing the AromaScan® device as noted above or other suitable instrument, except a 30 wt. % mica filled composition is used as the reference (or denominator) compound. In equation form, $$\text{Relative Aroma Index} = \frac{\text{average readings of pellets including a primary mineral filler and optionally including calcium carbonate or other odor suppressing compound}}{\text{average readings of pellets including 30 wt \% mica only without an odor suppressing basic compound}}$$

Thus, a composition consisting essentially of 30% talc, 10% calcium carbonate and the balance polypropylene would have a relative aroma index, relative to a 30% by weight mica composition of:

$$\text{Relative Aroma Index} = \frac{\text{average readings of 30\% talc, 10\% calcium carbonate, 60\% polypropylene composition}}{\text{average readings of 30\% mica, 70\% polypropylene composition}}$$

A process for preparing materials useful in connection with the invention also includes: (a) preparing a melt-compounded composition including from about t 90 percent by weight of a polypropylene polymer, from about 10 to about 50 percent by weight of a primary mineral filler and optionally an effective odor-reducing amount of a basic or optionally acidic organic or inorganic compound; (b) extruding the melt-compounded composition into a sheet; and (c) forming a food contact article from the sheet, wherein the melt compounded composition exhibits a relative aroma index of 0.75 or less. Particularly preferred primary mineral fillers include talc, kaolin, bentonite and wollastonite.

While the invention has been exemplified and described in detail, numerous modifications to specific examples within the spirit and scope of the invention will be apparent to those of skill in the art. The invention is defined in the appended claims.

What we claim is:

1. A three compartment disposable food serving plate comprising a substantially planar bottom portion, a sidewall portion extending about the periphery of said bottom portion and projecting upwardly therefrom, a flange portion extending outwardly from said sidewall portion and a divider portion configured so as to segment said plate into three compartments of differing volume, said divider portion having a central junction portion and three ribs extending outwardly therefrom, a first rib, a second rib and a third rib; each of said ribs projecting upwardly from said bottom portion and extending from said central junction portion to said sidewall portion, wherein each of said ribs is substantially angularly joined to said bottom portion and said sidewall portion and wherein a first included angle between said first and second ribs differs from a second included angle between said second and third ribs and a third included angle between said first and third ribs differs from said first and second included angles.

2. The disposable food serving plate according to claim 1, wherein said first and second included angles, in the aggregate, total more than about 200 degrees.

3. The disposable food serving plate according to claim 2, wherein said first included angle is from about 90 to about 110 degrees and said second included angle is from about 115 to about 135 degrees.

4. The disposable food serving plate according to claim 3, wherein said third included angle is from about 125 to about 145 degrees.

5. The disposable food serving plate according to claim 1, wherein each of said first, second and third ribs has a substantially flat top portion.

6. The disposable food serving plate according to claim 5, wherein said substantially flat top portion of said ribs is substantially angularly joined to a pair of upwardly projecting rib walls.

7. The disposable food serving plate according to claim 6, wherein the ratio of the diameter of the plate to the widths of said substantially flat top portions of said ribs is from about 55 to about 110.

8. The disposable food serving plate according to claim 7, wherein the ratio of the diameter of the plate to the widths of said substantially flat portions is from about 65 to about 90.

9. A three compartment disposable food serving plate comprising a substantially planar bottom portion, a sidewall portion extending about the periphery of said bottom portion and projecting upwardly therefrom, a flange portion extending outwardly from said sidewall portion and a divider portion configured so as to segment said plate into three compartments of differing volume, said divider having a central junction portion and three ribs extending outwardly therefrom, a first rib, a second rib and a third rib; each of said ribs projecting upwardly from said bottom portion and extending from said central junction portion to said sidewall portion, wherein each of said ribs is substantially angularly joined to said bottom portion and said sidewall portion and wherein a first included angle between said first and second ribs differs from a second included angle between said second and third ribs and a third included angle between said first and third ribs differs from said first and second included angles, and wherein further said plate is formed of a mineral-filled polyolefin sheet and is characterized by a profile extending from said bottom portion to the outer edge of the flange, wherein changes in direction of said profile are perpetrated by way of a plurality of arcuate portions, each of said arcuate portions having a radius of curvature and wherein further, the ratio of the length of each of the radii of curvature to the diameter of the plate is at least about 0.02.

10. The disposable food serving plate according to claim 9, wherein the ratio of each of said radii of curvature to the diameter of said plate is at least about 0.03.

11. The disposable food serving plate according to claim 9, wherein the ratio of each of said radii of curvature to the characteristic diameter of said plate is at least about 0.035.

12. The disposable food serving plate according to claim 9, wherein said plate has a wall thickness of from about 10 to about 80 mils.

13. The disposable food serving plate according to claim 9, wherein said plate has a wall thickness of from about 15 to about 25 mils.

14. The disposable food serving plate according to claim 9, having a wall thickness from about 10 to about 80 mils consisting essentially of from about 40 to about 90 percent by weight of a polypropylene polymer, from about 10 to about 60 percent by weight of a mineral filler, from about 1 to about 15 percent by weight polyethylene, from about 0.1 to about 5 weight percent titanium dioxide and optionally including a basic organic or inorganic compound comprising the reaction product of an alkali metal or alkaline earth element with carbonates, phosphates, carboxylic acids as well as alkali metal and alkaline earth element oxides, hydroxides, or silicates and basic metal oxides, including mixtures of silicon dioxide with one or more of the following oxides: magnesium oxide, calcium oxide, barium oxide, and mixtures thereof.

15. The disposable food serving plate according to claim 14, wherein said basic organic or inorganic compound comprises calcium carbonate and said calcium carbonate is present in an amount of from about 5 to about 20 weight percent.

16. The disposable food serving plate according to claim 14, wherein polyethylene is present from about 2.5 to about 15 percent by weight.

17. The disposable food serving plate according to claim 16, wherein polyethylene is present from about 4 to about 5 weight percent.

18. The disposable food serving plate according to claim 14, wherein titanium dioxide is present from about 0.1 to about 3 weight percent.

19. The disposable food serving plate according to claim 18, wherein titanium dioxide is present from about 0.25 to about 2 percent by weight.

20. The disposable food serving plate according to claim 14, wherein titanium dioxide is present in an amount of at least about 0.5 percent by weight.

21. The disposable food serving plate according to claim 14, wherein said article has a wall caliper of from about 10 to about 50 mils.

22. The disposable food serving plate according to claim 21, wherein said article has a wall caliper of from about 15 to about 25 mils.

23. The disposable food serving plate according to claim 14, wherein said mineral filler is mica.

24. The disposable food serving plate according to claim 14, wherein said polypropylene polymer is isotactic polypropylene.

25. The disposable food serving plate according to claim 24, wherein said isotactic polypropylene has a melt index of from about 0.3 to about 4.

26. The disposable food serving plate according to claim 25, wherein said isotactic polypropylene has a melt flow index of about 1.5.

27. The disposable food serving plate according to claim 14, wherein said polyethylene is HDPE.

28. The disposable food serving plate according to claim 14, wherein said polyethylene is LLDPE.

29. A three compartment disposable food serving plate formed from a mineral-filled polyolefin sheet comprising:

a substantially planar bottom portion;

a first rim portion extending outwardly therefrom, said first rim portion being upwardly convex and subtending a first arc with a first radius of curvature;

a second rim portion joined to said first rim portion, and extending outwardly therefrom, said second rim portion being downwardly convex, subtending a second arc with a second radius of curvature;

a third rim portion joined to said second rim portion and extending outwardly therefrom, said third rim portion being downwardly convex, subtending a third arc with a third radius of curvature, said second and third rim portions forming a sidewall portion; and, a fourth rim portion joined to said third rim portion and extending outwardly therefrom, said fourth rim portion being downwardly convex subtending a fourth arc having a fourth radius of curvature, wherein the length of said second arc of said second rim portion is substantially less than the length of said fourth arc of said fourth rim portion which, in turn, is substantially less than the length of said first arc of said first rim portion and wherein said fourth radius of curvature of said fourth rim portion is less than said third radius of curvature of said third rim portion which, in turn, is less than said second radius of curvature of said second rim portion and wherein the angle of said first arc is greater that about 55 degrees and the angle of said third arc is greater than about 45 degrees, said plate further comprising a divider portion configured so as to segment said plate into three compartments of differing volume, said divider portion having a central junction portion and three ribs extending outwardly therefrom, a first rib, a second rib and a third rib;

each of said ribs projecting upwardly from said bottom portion and extending from said central junction portion to said sidewall portion, wherein each of said ribs is substantially angularly joined to said bottom portion and said sidewall portion and wherein a first included angle between said first and second ribs differs from a second included angle between said second and third ribs and a third included angle between said first and third ribs differs from said first and second included angles.

30. The disposable food serving plate according to claim 29, wherein the angle of said fourth arc is less than about 75 degrees.

31. The disposable food serving plate according to claim 29, wherein the length of said first arc is substantially equivalent to the length of said third arc and said first radius of curvature of said first arc is substantially equivalent to said third radius of curvature of said third arc.

32. The disposable food serving plate according to claim 29, wherein the height of the center of curvature of said first rim portion above the plane of said bottom portion is substantially less than the distance by which the center of curvature of said second rim portion is below the plane of said bottom portion.

33. The disposable food serving plate according to claim 29, wherein the horizontal displacement of the center of curvature of said second rim portion from the center of curvature of said first rim portion is at least about twice said first radius of curvature of said first rim portion.

34. The disposable food serving plate according to claim 29, wherein said height of the center of curvature of said third rim portion above the plane of said bottom portion is less than the height of the center of curvature of said fourth rim portion above the plane of said bottom portion.

35. The disposable food serving plate according to claim 29, wherein the horizontal displacement of the center of curvature of said second rim portion is located outwardly from the center of curvature of both said third and fourth rim portions.

36. The disposable food serving plate according to claim 29, wherein the height of the center of curvature of said third rim portion above the plane of said bottom portion is less than about 0.3 times the radius of curvature of said fourth rim portion and the height of the center of curvature of said fourth rim portion above the plane of said bottom portion is at least about 0.4 times said first radius of curvature of said first rim portion.

37. The disposable food serving plate according to claim 29, wherein the ratio of the length of said fourth radius of curvature to the diameter of said plate is at least about 0.03.

38. The disposable food serving plate according to claim 29, wherein the ratio of the length of said third radius of curvature to the diameter of said plate is at least about 0.050.

39. The disposable food serving plate according to claim 29, wherein the ratio of the length of said second radius of curvature to the diameter of said plate is at least about 0.2.

40. The disposable food serving plate according to claim 29, wherein the ratio of the length of said first radius of curvature to the diameter of said plate is at least about 0.045.

41. The disposable food serving plate according to claim 29, wherein the length of said first arc is substantially equivalent to the length of said third arc.

42. The disposable food serving plate according to claim 29, wherein the length of said radius of curvature of said first arc is substantially equivalent to the length of said radius of curvature of said third arc.

* * * * *

(12) EX PARTE REEXAMINATION CERTIFICATE (5136th)
United States Patent
Littlejohn et al.

(10) Number: US 6,440,509 C1
(45) Certificate Issued: Jul. 5, 2005

(54) COMPARTMENTED DISPOSABLE PLATE WITH ASYMMETRIC RIB GEOMETRY

(75) Inventors: Mark B. Littlejohn, Appleton, WI (US); Anthony J. Swiontek, Neenah, WI (US); Margaret P. Neer, Neenah, WI (US); Cristian M. Neculescu, Neenah, WI (US); Brigitte K. Weigert, Appleton, WI (US)

(73) Assignee: Fort James Corporation, Deerfield, IL (US)

Reexamination Request:
No. 90/006,622, May 6, 2003

Reexamination Certificate for:
Patent No.: 6,440,509
Issued: Aug. 27, 2002
Appl. No.: 09/354,706
Filed: Jul. 16, 1999

(51) Int. Cl.[7] ............... A47G 19/02; A47G 19/03; B65D 21/032; B29D 7/01
(52) U.S. Cl. ............... 428/35.7; 206/503; 206/519; 220/406; 220/407; 220/515; 220/556; 220/575
(58) Field of Search ............... D7/545, 546, 585, D7/553.1–553.8, 500, 550.1; 206/515, 519, 499, 501, 505, 507, 509, 513, 514; 220/574, 575, 574.1, 574.3; 428/35.7

(56) References Cited

U.S. PATENT DOCUMENTS

| | | | |
|---|---|---|---|
| 2,738,915 A | 3/1956 | St. Clair | 229/2.5 |
| 4,746,057 A | 5/1988 | Wagner | 229/1.5 H |
| 4,781,295 A | 11/1988 | Gunesin et al. | 206/524.6 |
| D346,934 S | * 5/1994 | Littlejohn | |
| 6,211,501 B1 | * 4/2001 | McCarthy et al. | |
| 6,241,096 B1 | * 6/2001 | Littlejohn et al. | |

FOREIGN PATENT DOCUMENTS

| | | |
|---|---|---|
| EP | 0 837 003 A1 | 4/1998 |
| FR | 2101307 | 3/1972 |

* cited by examiner

*Primary Examiner*—Sandra M. Nolan

(57) ABSTRACT

A three-compartment, disposable food serving plate includes three ribs in an asymmetric array angularly joined to the bottom and sidewall of the plate. The plate preferably includes a four radius, smooth profile from the bottom to the outer rim and is formed from mineral-filled polyolefin sheet. Mica-filled polypropylene is particularly preferred.

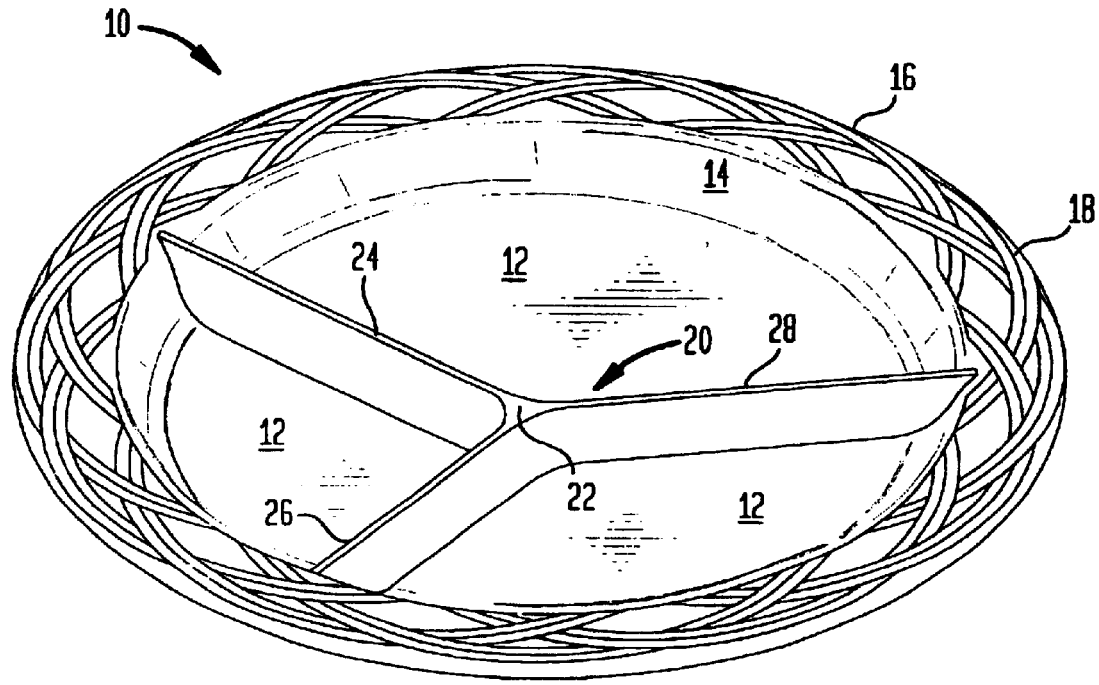

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 29–42 is confirmed.

Claim 5 is cancelled.

Claims 1, 6 and 9 are determined to be patentable as amended.

Claims 2–4, 7, 8 and 10–28, dependent on an amended claim, are determined to be patentable.

New claims 43–47 are added and determined to be patentable.

1. A three compartment disposable food serving plate comprising a substantially planar bottom portion, a sidewall portion extending about the periphery of said bottom portion and projecting upwardly therefrom, a flange portion extending outwardly from said sidewall portion and a divider portion configured so as to segment said plate into three compartments of differing volume, said divider portion having a central junction portion and three ribs extending outwardly therefrom, a first rib, a second rib and a third rib; each of said ribs projecting upwardly from said bottom portion and extending from said central junction portion to said sidewall portion, wherein each of said ribs is substantially angularly joined to said bottom portion and said sidewall portion and wherein a first included angle between said first and second ribs differs from a second included angle between said second and third ribs and a third included angle between said first and third ribs differs from said first and second included angles *and wherein further each of said first, second and third ribs has a substantially flat top portion*.

6. The disposable food serving plate according to claim [5] *1*, wherein said substantially flat top portion of said ribs is substantially angularly joined to a pair of upwardly projecting rib walls.

9. A three compartment disposable food serving plate comprising a substantially planar bottom portion, a sidewall portion extending about the periphery of said bottom portion and projecting upwardly therefrom, a flange portion extending outwardly from said sidewall portion and a divider portion configured so as to segment said plate into three compartments of differing volume, said divider having a central junction portion and three ribs extending outwardly therefrom, a first rib, a second rib and a third rib; each of said ribs projecting upwardly from said bottom portion and extending from said central junction portion to said sidewall portion, wherein each of said ribs is substantially angularly joined to said bottom portion and said sidewall portion and wherein a first included angle between said first and second ribs differs from a second included angle between said second and third ribs and a third included angle between said first and third ribs differs from said first and second included angles, and wherein further said plate is formed of a mineral-filled polyolefin sheet and is characterized by a profile extending from said bottom portion to the outer edge of the flange, wherein changes in direction of said profile are perpetrated by way of a plurality of arcuate portions, each of said arcuate portions having a radius of curvature and wherein further, the ratio of the length of each of the radii of curvature to the diameter of the plate is at least about 0.02 *and each of said first, second and third ribs has a substantially flat top portion*.

*43. A three compartment disposable food serving plate comprising a substantially planar bottom portion, a sidewall portion extending about the periphery of said bottom portion and projecting upwardly therefrom, a flange portion extending outwardly from said sidewall portion and a divider portion configured so as to segment said plate into three compartments of differing volume, said divider portion having a central junction portion and three ribs extending outwardly therefrom, a first rib, a second rib and a third rib; each of said ribs projecting upwardly from said bottom portion and extending from said central junction portion to said sidewall portion, wherein each of said ribs is substantially angularly joined to said bottom portion and said sidewall portion and wherein a first included angle between said first and second ribs differs from a second included angle between said second and third ribs and a third included angle between said first and third ribs differs from said first and second included angles and wherein the three compartment plate is thermoformed from a sheet of plastic material.*

*44. The three compartment disposable food serving plate according to claim 43, wherein the central junction portion is offset from the center of the plate.*

*45. The three compartment disposable food serving plate according to claim 43, wherein the flange has an embossed or debossed pattern.*

*46. The disposable food serving plate according to claim 43, wherein said article has a wall caliper of from about 10 to about 50 mils.*

*47. The disposable food serving plate according to claim 43, wherein said article has a wall caliper of from about 15 to about 25 mils.*

\* \* \* \* \*